(12) United States Patent
Sasaki et al.

(10) Patent No.: US 10,803,888 B1
(45) Date of Patent: Oct. 13, 2020

(54) MAGNETIC HEAD INCLUDING SPIN TORQUE OSCILLATOR AND MANUFACTURING METHOD FOR THE SAME

(71) Applicants: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Yoji Nomura, Milpitas, CA (US); Tetsuya Roppongi, Milpitas, CA (US); Atsushi Yamaguchi, Milpitas, CA (US)

(72) Inventors: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Yoji Nomura, Milpitas, CA (US); Tetsuya Roppongi, Milpitas, CA (US); Atsushi Yamaguchi, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/574,880

(22) Filed: Sep. 18, 2019

(51) Int. Cl.
*G11B 5/115* (2006.01)
*G11B 5/39* (2006.01)
*C23F 4/04* (2006.01)

(52) U.S. Cl.
CPC ............ *G11B 5/115* (2013.01); *G11B 5/3906* (2013.01); *C23F 4/04* (2013.01)

(58) Field of Classification Search
CPC .......... G11B 5/115; G11B 5/3906; C23F 4/04
See application file for complete search history.

(56) References Cited

U.S. PATENT DOCUMENTS

| | | | |
|---|---|---|---|
| 8,320,079 B2 | 11/2012 | Iwasaki et al. | |
| 8,917,481 B2 | 12/2014 | Kusukawa et al. | |
| 10,032,470 B1 | 7/2018 | Degawa et al. | |
| 10,109,302 B1 | 10/2018 | Shinohara et al. | |
| 10,121,497 B1* | 11/2018 | Takahashi | G11B 5/315 |
| 2006/0172532 A1* | 8/2006 | Morijiri | G11B 5/398 438/670 |
| 2009/0294403 A1* | 12/2009 | Kamijima | B82Y 25/00 216/22 |
| 2018/0075868 A1 | 3/2018 | Koui et al. | |

* cited by examiner

*Primary Examiner* — Anita K Alanko
(74) *Attorney, Agent, or Firm* — Oliff PLC

(57) ABSTRACT

A manufacturing method for a magnetic head includes the steps of: forming a main pole; forming a spin torque oscillator; and forming a trailing shield. The step of forming the spin torque oscillator includes: a step of forming a layered film; a step of forming an interposition layer; a step of forming a mask; a first etching step of etching a portion of the interposition layer using the mask; a second etching step of etching a portion of the layered film using the mask and the interposition layer as an etching mask; a step of removing the interposition layer and the mask; and a patterning step of patterning the layered film into the spin torque oscillator.

10 Claims, 28 Drawing Sheets

MAGNETIC HEAD INCLUDING SPIN TORQUE OSCILLATOR AND MANUFACTURING METHOD FOR THE SAME

BACKGROUND OF THE INVENTION

1. Field of the Invention

The present invention relates to a manufacturing method for a magnetic head including a spin torque oscillator.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil generates a magnetic field corresponding to data to be written on the recording medium. The magnetic path forming section is formed of a magnetic material and forms a magnetic path for passing a magnetic flux corresponding to a magnetic field generated by the coil.

The magnetic path forming section includes, for example, a main pole, a trailing shield, and a return path section. The main pole has a first end face located in a medium facing surface configured to face a recording medium. The trailing shield has a second end face located in the medium facing surface at a position forward relative to the first end face in a direction of travel of the recording medium. The return path section magnetically connects part of the main pole away from the medium facing surface to the trailing shield. The main pole generates from the first end face a write magnetic field for writing data on the recording medium.

Recently, the use of a spin torque oscillator in a magnetic head has been proposed as a method for increasing the recording density of a magnetic disk drive. U.S. Pat. Nos. 8,320,079 B2, 8,917,481 B2, 10,032,470 B1, and 10,109, 302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity.

U.S. Patent Application Publication No. 2018/0075868 A1 discloses a technology of using a spin torque oscillator that adjusts permeability. The spin torque oscillator blocks magnetic flux leaking from the main pole to the trailing shield. The technology allows a gap between the main pole and the shield to be smaller, thus making it possible to increase the recording density by steepening the gradient of change in the strength of the write magnetic field.

In both of the above-described technologies, the spin torque oscillator is disposed between the main pole and the trailing shield and electrically connected to the main pole and the trailing shield. A current for operating the spin torque oscillator is supplied via the main pole and the trailing shield. Hereinafter, a surface of the spin torque oscillator in contact with the main pole will be referred to as a bottom surface of the spin torque oscillator, and a surface of the spin torque oscillator in contact with the trailing shield will be referred to as a top surface of the spin torque oscillator. Similarly, a surface of the main pole in contact with the spin torque oscillator will be referred to as a top surface of the main pole, and a surface of the trailing shield in contact with the spin torque oscillator will be referred to as a bottom surface of the trailing shield.

A method of forming a spin torque oscillator will now be discussed. Typically, a spin torque oscillator is formed as follows. A layered film to later become the spin torque oscillator is initially formed on the top surface of the main pole and then patterned by etching so that a plurality of surfaces of the spin torque oscillator other than the top and bottom surfaces are formed in the layered film. Here, a width in the track width direction will be simply referred to as a width. Conventionally, the width of the top surface of the spin torque oscillator is formed to be smaller than the width of the bottom surface of the spin torque oscillator. As a result, the contact area between the spin torque oscillator and the trailing shield is smaller than that between the spin torque oscillator and the main pole.

Typically, a magnetic head using a spin torque oscillator can achieve a higher recording density by increasing a voltage applied to the spin torque oscillator. However, as described above, the contact area between the spin torque oscillator and the trailing shield is small. In such a case, applying a higher voltage to the spin torque oscillator can cause the spin torque oscillator to generate heat, thus causing the lifetime of the magnetic head to get shorter.

The spin torque oscillator is typically formed on a portion of the top surface of the main pole near the medium facing surface. The width of the spin torque oscillator is almost equal to the width of the portion of the top surface of the main pole near the medium facing surface. If the portion of the top surface of the main pole near the medium facing surface is reduced in width in order to reduce the track width, the width of the spin torque oscillator also decreases. In such a case, the above-described problem becomes significant.

SUMMARY OF THE INVENTION

It is an object of the present invention to provide a manufacturing method for a magnetic head including a spin torque oscillator, the manufacturing method making it possible to prevent a reduction in the contact area between the spin torque oscillator and a trailing shield.

A magnetic head manufactured by a manufacturing method of the present invention includes: a medium facing surface configured to face a recording medium; a main pole configured to generate a write magnetic field for writing data on the recording medium; a trailing shield formed of a magnetic material and located forward relative to the main pole in the direction of travel of the recording medium; a spin torque oscillator disposed between the main pole and the trailing shield and electrically connected to the main pole and the trailing shield; and a substrate having a top surface. The main pole, the trailing shield and the spin torque oscillator are disposed over the top surface of the substrate.

The manufacturing method for the magnetic head of the present invention includes the steps of: forming the main pole; forming the spin torque oscillator after the main pole is formed; and forming the trailing shield after the spin torque oscillator is formed.

The step of forming the spin torque oscillator includes: a step of forming a layered film on the main pole, the layered film becoming the spin torque oscillator later; a step of forming an interposition layer on the layered film; a step of forming a mask on the interposition layer; a first etching step of etching a portion of the interposition layer using the mask; a second etching step of etching a portion of the layered film using the mask and the interposition layer as an etching mask after the first etching step; a step of removing the interposition layer and the mask after the second etching step; and a patterning step of patterning the layered film into the spin torque oscillator after the interposition layer and the mask are removed.

In the manufacturing method for the magnetic head of the present invention, the spin torque oscillator may have a rear end face located farthest from the medium facing surface, and a first side surface and a second side surface opposite to each other in the track width direction. In such a case, the mask may have a first sidewall for defining the shape and the position of the first side surface, and a second sidewall for defining the shape and the position of the second side surface. Further, in such a case, the second etching step may be a step of etching the layered film so as to provide the layered film with the first side surface and the second side surface. The patterning step may be a step of etching the layered film so as to provide the layered film with the rear end face.

In the manufacturing method for the magnetic head of the present invention, the interposition layer may be formed of an inorganic insulating material.

In the manufacturing method for the magnetic head of the present invention, the mask may be formed of a positive photoresist. Alternatively, the mask may be formed of a negative photoresist.

In the manufacturing method for the magnetic head of the present invention, when the mask is formed of a negative photoresist, the step of forming of the mask may include the steps of: forming an initial mask which is to become the mask later; forming a separating film on the initial mask; forming an etching mask of a positive photoresist on the separating film; etching the initial mask and the separating film using the etching mask so as to make the initial mask into the mask; and removing the etching mask. Alternatively, the step of forming the mask may include the steps of: forming an initial mask which is to become the mask later; forming an etching mask of carbon on the initial mask; and etching the initial mask using the etching mask so as to make the initial mask into the mask.

In the manufacturing method for the magnetic head of the present invention, the magnetic head may further include nonmagnetic layers located on opposite sides of the spin torque oscillator in the track width direction. In such a case, the step of removing the interposition layer and the mask may include a first removal step of removing a portion of the interposition layer that is covered with the mask, and a second removal step of removing the remainder of the interposition layer and the mask. The manufacturing method for the magnetic head of the present invention may further include the step of forming the nonmagnetic layers with the mask left intact after the first removal step and before the second removal step.

In the manufacturing method for the magnetic head of the present invention, the spin torque oscillator may have a first side surface and a second side surface opposite to each other in the track width direction. In such a case, each of the first side surface and the second side surface may form an angle in the range of 0° to 7° with respect to a direction perpendicular to the top surface of the substrate.

In the manufacturing method for the magnetic head of the present invention, the main pole may have an end face located in the medium facing surface. The end face of the main pole has a top edge farthest from the top surface of the substrate. The spin torque oscillator may have a front end face located in the medium facing surface. The front end face of the spin torque oscillator has a bottom edge closest to the top surface of the substrate. The width of the top edge in the track width direction may be equal to the width of the bottom edge in the track width direction. The position of the top edge in the track width direction may be the same as the position of the bottom edge in the track width direction.

According to the present invention, the step of forming the spin torque oscillator includes the first etching step of etching a portion of the interposition layer using a mask and the second etching step of etching a portion of the layered film using the mask and the interposition layer as an etching mask. By virtue of this, the present invention makes it possible to prevent the contact area between the spin torque oscillator and the trailing shield from becoming smaller.

Other objects, features and advantages of the present invention will become fully apparent from the following description.

DETAILED DESCRIPTION OF THE PREFERRED EMBODIMENTS

First Embodiment

Figure 5:
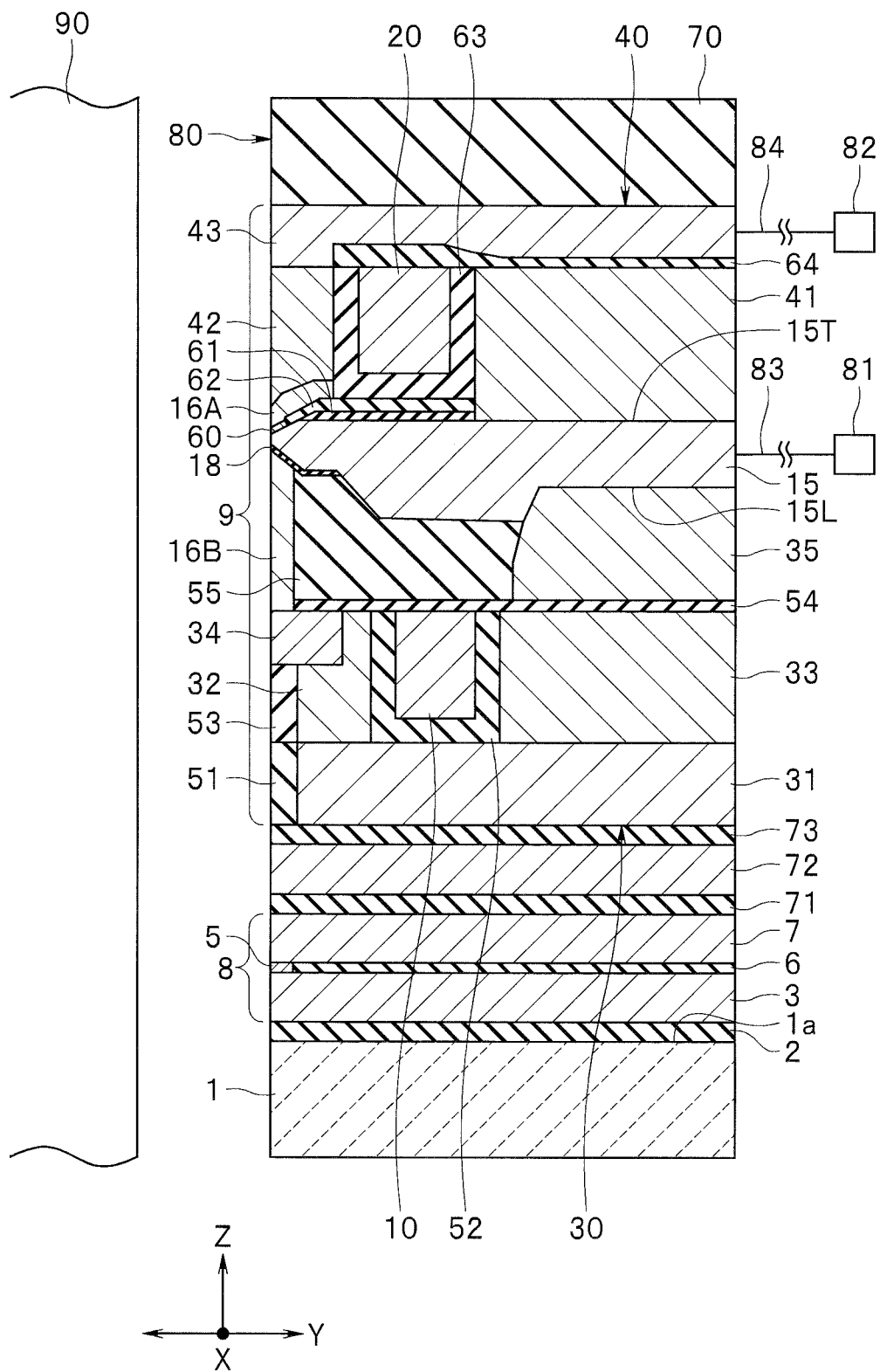
FIG. 5 is a cross-sectional view showing a configuration of the magnetic head according to the first embodiment of the invention.
Figure 6:
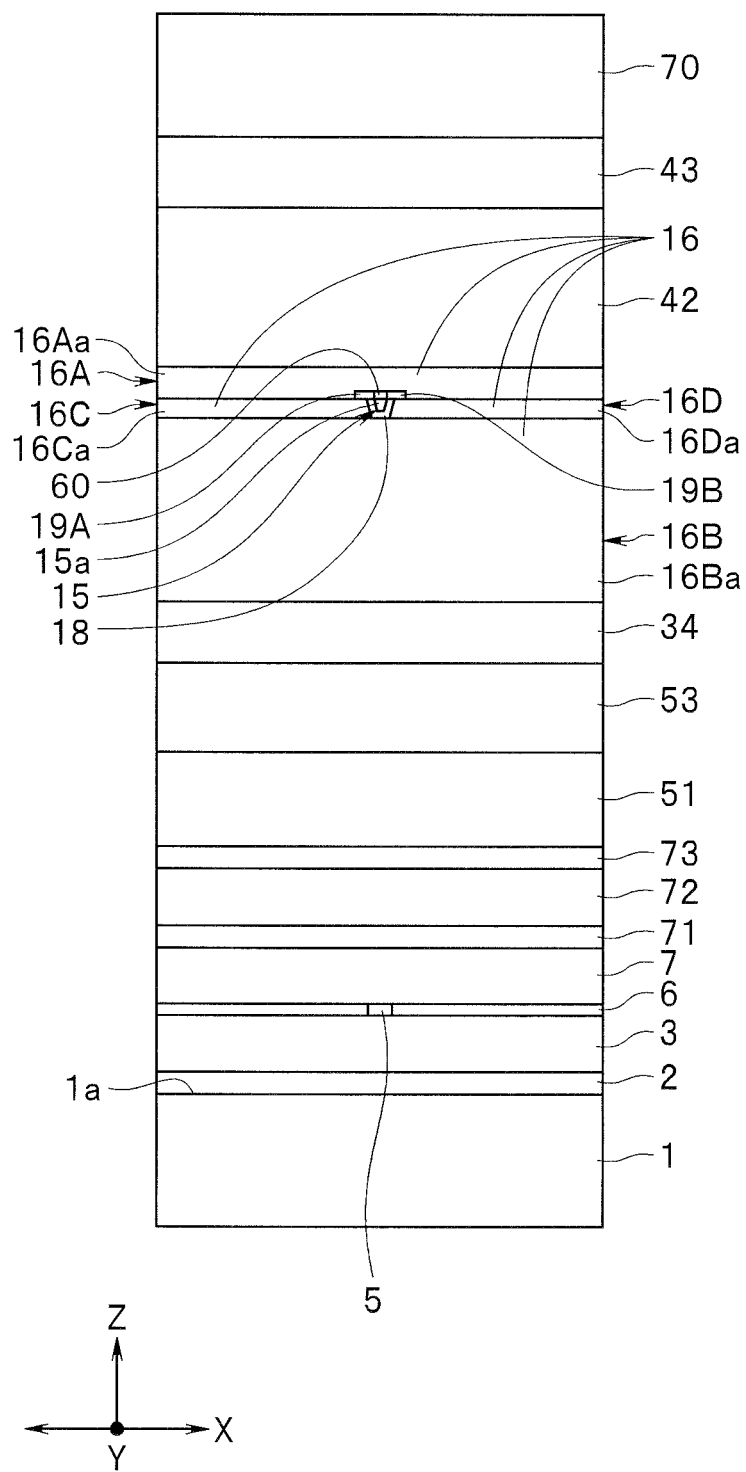
FIG. 6 is a front view showing a medium facing surface of the magnetic head according to the first embodiment of the invention.
Figure 7:
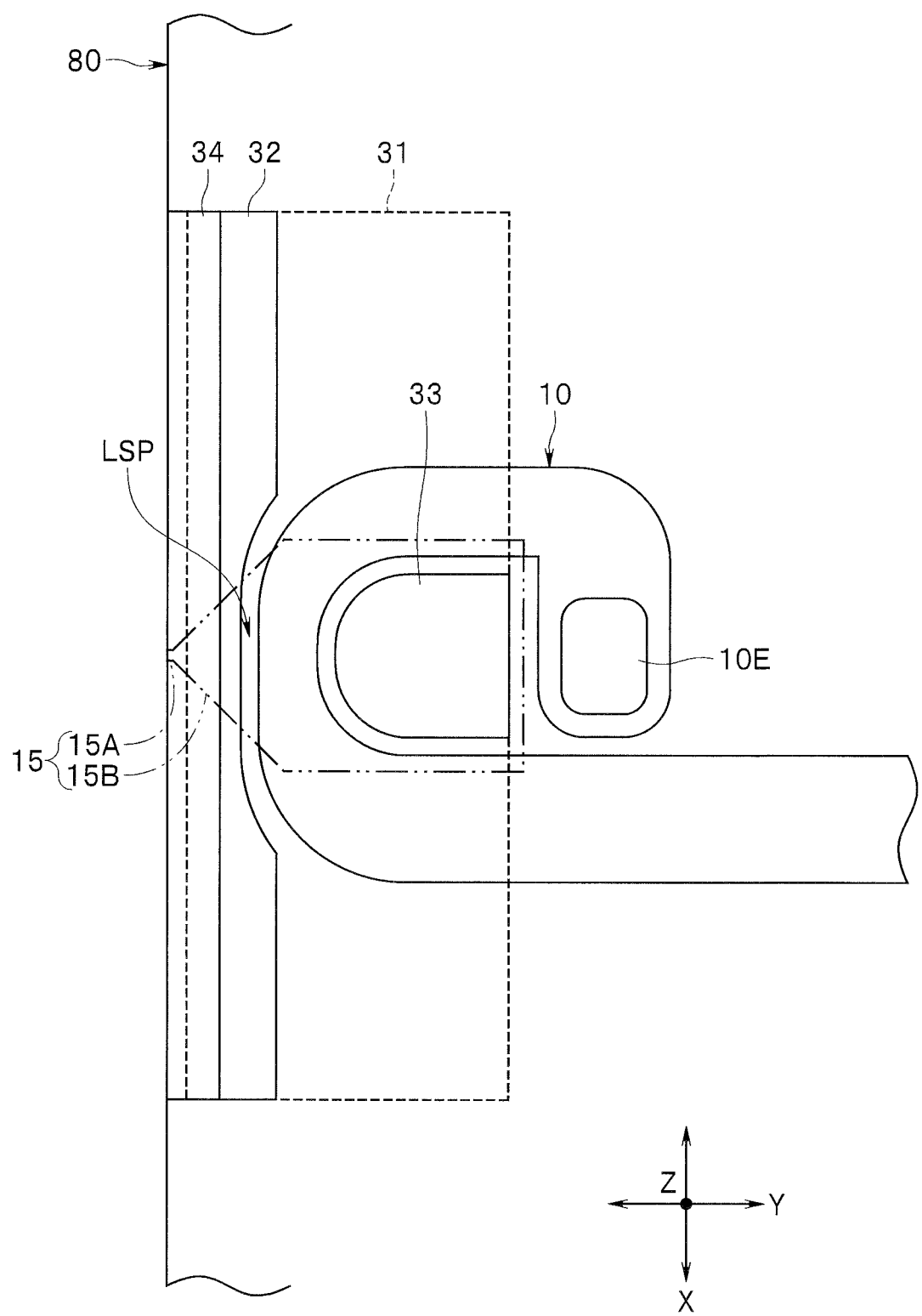
FIG. 7 is a plan view showing a lower coil portion of the magnetic head according to the first embodiment of the invention.
Figure 8:
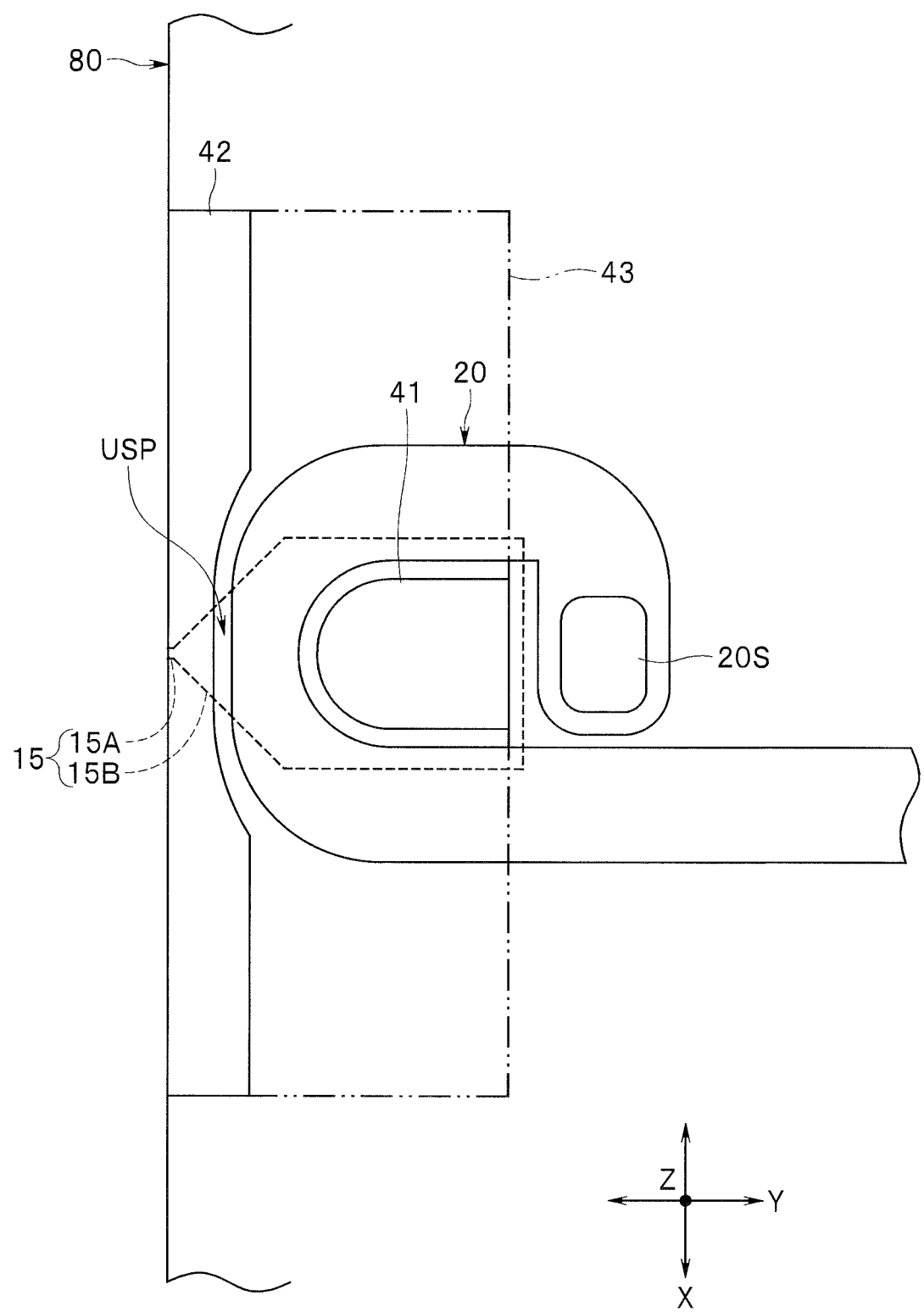
FIG. 8 is a plan view showing an upper coil portion of the magnetic head according to the first embodiment of the invention.

Preferred embodiments of the present invention will now be described in detail with reference to the drawings. First, reference is made to FIG. 5 to FIG. 8 to describe a configuration of a magnetic head according to a first embodiment of the invention. FIG. 5 is a cross-sectional view showing the configuration of the magnetic head. FIG. 6 is a front view showing the medium facing surface of the magnetic head. FIG. 7 is a plan view showing a lower coil portion of the magnetic head. FIG. 8 is a plan view showing an upper coil portion of the magnetic head.

The magnetic head according to the present embodiment is a magnetic head for perpendicular magnetic recording. The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5, the magnetic head has the medium facing surface 80. As shown in FIGS. 5 and 6, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 5 shows a cross section that intersects the end face 15a of the main pole 15 and that is perpendicular to the medium facing surface 80 and to the top surface 1a of the substrate 1.

As shown in FIG. 6, the write shield 16 includes a trailing shield 16A, a leading shield 16B, and two side shields 16C and 16D. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15. The side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B.

As shown in FIG. 6, the trailing shield 16A has a front end face 16Aa located in the medium facing surface 80. The leasing shield 16B has a front end face 16Ba located in the medium facing surface 80. The side shield 16C has a front end face 16Ca located in the medium facing surface 80. The side shield 16D has a front end face 16Da located in the medium facing surface 80.

The front end face 16Aa is located forward relative to the end face 15a of the main pole 15 in the direction of travel of the recording medium 90. The front end face 16Ba is located backward relative to the end face 15a of the main pole 15 in the direction of travel of the recording medium 90. The front end faces 16Ca and 16Da are located on opposite sides of the end face 15a of the main pole 15 in the track width direction. In the medium facing surface 80, the front end faces 16Aa, 16Ba, 16Ca and 16Da are arranged to surround the end face 15a of the main pole 15.

The write shield 16 is formed of a magnetic material. For example, CoFeN, CoNiFe, FeNi, or CoFe can be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 may be an element configured to generate a microwave magnetic field or an element configured to adjust a permeability between the main pole 15 and the trailing shield 16A. The configuration of the spin torque oscillator will be described in detail later.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe can be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 8) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 7) for a portion of the coil to pass through.

The lower return path section 30 includes coupling sections 31, 32, 33, 34 and 35. The coupling section 31 is disposed on the nonmagnetic layer 73. The coupling sections 32 and 33 are both disposed on the coupling section 31. The coupling section 32 is located near the medium facing surface 80. The coupling section 33 is located farther from the medium facing surface 80 than the coupling section 32. The coupling sections 31 and 32 have their respective end faces that face toward the medium facing surface 80 and that are each located at a distance from the medium facing surface 80.

As shown in FIG. 7, the lower coil portion 10 is wound around the coupling section 33. The write head unit 9 further includes: an insulating layer 51 formed of an insulating material, lying on the nonmagnetic layer 73 and surrounding the coupling section 31; an insulating film 52 formed of an insulating material and isolating the lower coil portion 10 from the coupling sections 31 to 33; and an insulating layer 53 formed of an insulating material and disposed around the lower coil portion 10 and the coupling section 32. The coupling section 34 is embedded in the coupling section 32 and the insulating layer 53. The coupling section 34 has an end face located in the medium facing surface 80. The top surfaces of the lower coil portion 10, the coupling sections 32 to 34, the insulating film 52 and the insulating layer 53 are even with each other. The insulating layers 51 and 53 and the insulating film 52 are formed of alumina, for example.

The leading shield 16B lies on a part of the top surface of the coupling section 34. The write head unit 9 further includes an insulating layer 54 formed of an insulating material. The insulating layer 54 lies on another part of the top surface of the coupling section 34 and on the top surfaces of the lower coil portion 10, the coupling sections 32 and 33, the insulating film 52 and the insulating layer 53. The coupling section 35 lies over the coupling section 33 with the insulating layer 53 interposed therebetween. Note that even if the insulating layer 53 is interposed between the coupling sections 33 and 35, the coupling sections 33 and 35 are magnetically coupled to each other. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling section 35. The nonmagnetic layer 55 is formed of alumina or silicon oxide ($SiO_2$), for example.

The side shields 16C and 16D are disposed on the leading shield 16B. The main pole 15 has the end face 15a, and also a top surface 15T (see FIG. 5) farthest from the top surface 1a of the substrate 1, a bottom end 15L (see FIG. 5) opposite to the top surface 15T, and a first side surface and a second side surface (see FIGS. 7 and 8) opposite to each other in the track width direction (the X direction). As shown in FIG. 6, the side shield 16C has a first sidewall opposed to a portion of the first side surface of the main pole 15 located near the medium facing surface 80. The side shield 16D has a second sidewall opposed to a portion of the second side surface of the main pole 15 located near the medium facing surface 80.

The write head unit 9 further includes a first gap layer 18 formed of a nonmagnetic material. The first gap layer 18 is disposed to extend along the first and second sidewalls of the side shields 16C and 16D, the top surface of the leading shield 16B and the top surface of the nonmagnetic layer 55. The nonmagnetic material used to form the first gap layer 18 may be an insulating material such as alumina, for example.

As shown in FIG. 5, the first gap layer 18 is interposed between a portion of the bottom end 15L of the main pole 15 and the top surfaces of the leading shield 16B and the nonmagnetic layer 55. As shown in FIG. 6, the first gap layer 18 is interposed also between the first side surface of the main pole 15 and the first sidewall of the side shield 16C, and between the second side surface of the main pole 15 and the second sidewall of the side shield 16D.

At a location apart from the medium facing surface 80, the bottom end 15L of the main pole 15 is in contact with the top surface of the coupling section 35. The main pole 15 is formed of a ferromagnetic material containing one or more elements selected from Ni, Fe, and Co, such as FeNi, CoNiFe, or CoFe. The shape of the main pole 15 will be described in detail later.

The magnetic head further includes a first nonmagnetic layer (not shown) formed of a nonmagnetic material and disposed around the main pole 15 and the side shields 16C and 16D. An example of the nonmagnetic material used to form the first nonmagnetic layer is an insulating material such as alumina.

The spin torque oscillator 60 is disposed on and contacts the top surface 15T of the main pole 15 in the vicinity of the medium facing surface 80. The end face 15a of the main pole 15 has a side adjacent to the spin torque oscillator 60, the side defining the track width.

The write head unit 9 further includes a second gap layer 19 formed of a nonmagnetic material. The second gap layer 19 includes a first portion 19A and a second portion 19B located on opposite sides of the spin torque oscillator 60 in the track width direction (the X direction). The first portion 19A is located on the side shield 16C and the first gap layer 18. The second portion 19B is located on the side shield 16D and the first gap layer 18. An example of the nonmagnetic material used to form the second gap layer 19 is an insulating material such as alumina.

The write head unit 9 further includes: a nonmagnetic layer 61 formed of a nonmagnetic material and disposed on a first portion of the top surface 15T of the main pole 15, the first portion being located away from the spin torque oscillator 60; and an insulating layer 62 formed of an insulating material and disposed to cover the main pole 15 and the nonmagnetic layer 61. The nonmagnetic layer 61 is formed of silicon oxide, for example. The insulating layer 62 is formed of alumina, for example.

The trailing shield 16A is disposed on the side shields 16C and 16D, the second gap layer 19, the spin torque oscillator 60 and the insulating layer 62, and in contact with the top surfaces of the side shields 16C and 16D, the second gap layer 19, the spin torque oscillator 60 and the insulating layer 62. In the medium facing surface 80, a portion of the front end face 16Aa of the trailing shield 16A is spaced a predetermined distance away from the end face 15a of the main pole 15. The predetermined distance is preferably in the range of 5 to 60 nm, and may be 30 to 60 nm, for example.

The upper return path section 40 includes coupling sections 41, 42, and 43. The coupling section 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15. The coupling section 42 is disposed on the trailing shield 16A. The coupling section 42 has an end face located in the medium facing surface 80.

As shown in FIG. 8, the upper coil portion 20 is wound around the coupling section 41. The write head unit 9 further includes: an insulating film 63 formed of an insulating material and separating at least part of the upper coil portion 20 from the trailing shield 16A, the coupling sections 41 and 42 and the insulating layer 62; and a second nonmagnetic layer (not shown) formed of a nonmagnetic material and disposed around the trailing shield 16A, the upper coil portion 20 and the coupling section 42. The insulating film 63 is formed of alumina, for example. The nonmagnetic material used to form the second nonmagnetic layer may be, for example, an insulating material such as alumina.

The write head unit 9 further includes an insulating layer 64 formed of an insulating material and disposed on the upper coil portion 20, the coupling section 41 and the insulating film 63. The insulating layer 64 includes a first portion lying on the upper coil portion 20 and a second portion lying on the coupling section 41. The second second portion is smaller in maximum thickness (maximum dimension in the Z direction) than the first portion.

The coupling section 43 is disposed on the coupling section 42 and the insulating layer 64. The coupling section 43 has an end face located in the medium facing surface 80. The coupling section 43 includes a first portion lying on the coupling section 42, a second portion lying over the coupling section 41 with the insulating layer 64 interposed therebetween, and a third portion connecting the first and second portions. Note than even if the insulating layer 64 is interposed between the coupling section 41 and the second portion of the coupling section 43, the coupling sections 41 and 43 are magnetically coupled to each other.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, the second gap layer 19, and the spin torque oscillator 60. The coil, the main pole 15, the write shield 16, the first gap layer 18, the second gap layer 19, and the spin torque oscillator 60 are disposed over the top surface 1a of the substrate 1. The write shield 16 includes the trailing shield 16A, the leading shield 16B, and the side shields 16C and 16D. The second gap layer 19 includes the first portion 19A and the second portion 19B located on opposite sides of the spin torque oscillator 60 in the track width direction. The first portion 19A and the second portion 19B correspond to nonmagnetic layers located on opposite sides of the spin torque oscillator in the track width direction.

The write head unit 9 further includes the upper return path section 40 and the lower return path section 30. The upper return path section 40 includes the coupling sections 41, 42, and 43. The lower return path section 30 includes the coupling sections 31, 32, 33, 34, and 35.

The write shield 16 captures a disturbance magnetic field applied to the magnetic head from outside the magnetic head. This can prevent erroneous writing on the recording medium 90 that would be caused by the disturbance magnetic field being intensively captured into the main pole 15. The write shield 16 further has the function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have the function of allowing a magnetic flux that has been generated from the end face 15a of the main pole 15 and has magnetized a portion of the recording medium 90 to flow back.

The spin torque oscillator 60 is electrically connected to the main pole 15 and the trailing shield 16A. As shown in FIG. 5, the magnetic head further includes: two terminals 81 and 82 connected to a power source (not shown); wiring 83 for electrically connecting the terminal 81 and the main pole 15; and wiring 84 for electrically connecting the terminal 82 and the coupling section 43. The trailing shield 16A is electrically connected to the coupling section 43 via the coupling section 42. A current for operating the spin torque oscillator 60, which will hereinafter be referred to as a driving current, is supplied via the terminals 81 and 82. The driving current flows through the main pole 15, the spin torque oscillator 60, the trailing shield 16A, the coupling section 42, and the coupling section 43 in this order.

Figure 4:
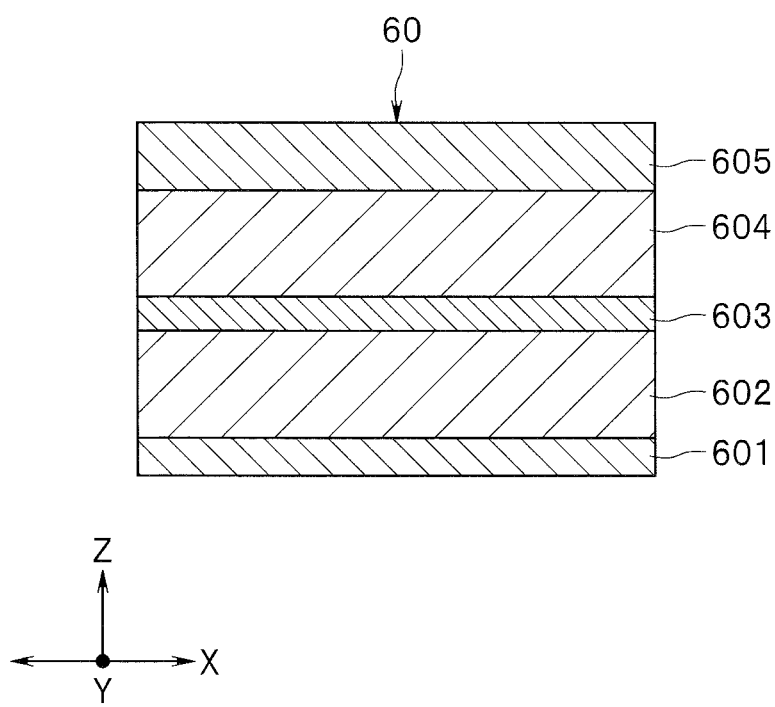
FIG. 4 is a cross-sectional view showing an example of a spin torque oscillator in the magnetic head according to the first embodiment of the invention.

Reference is now made to FIG. 4 to describe a configuration of the spin torque oscillator 60. FIG. 4 is a cross-sectional view showing an example of a configuration of the spin torque oscillator 60. The spin torque oscillator 60 shown in FIG. 4 is one configured to generate a microwave magnetic field. This spin torque oscillator 60 includes an underlayer 601, a magnetic-field generating layer 602, a nonmagnetic layer 603, a spin injection layer 604, and a protective layer 604 stacked in this order, from closest to farthest from the main pole 15.

The underlayer 601 and the protective layer 605 are each formed of a nonmagnetic metal material. For example, the underlayer 601 and the protective layer 605 are each formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

The magnetic-field generating layer 602 is formed of a material whose magnetization direction is parallel or almost parallel to the film plane when no driving current flows. The magnetic-field generating layer 602 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 603 is formed of a material having high spin permeability. The nonmagnetic layer 603 may be a nonmagnetic metal layer formed of one of Ag, Au, Cr, and Al, or a tunnel barrier layer formed of MgO or $Al_2O_3$.

The spin injection layer 604 is formed of a material having magnetic anisotropy in a direction perpendicular to the film plane. The spin injection layer 604 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

In the spin torque oscillator 60 shown in FIG. 4, passing a driving current in the direction from the underlayer 601 to the protective layer 605 imparts a spin torque to the magnetization of the magnetic-field generating layer 602 to cause precession of the magnetization of the magnetic-field generating layer 602. As a result, a microwave magnetic field is generated from the magnetic-field generating layer 602.

Figure 1:
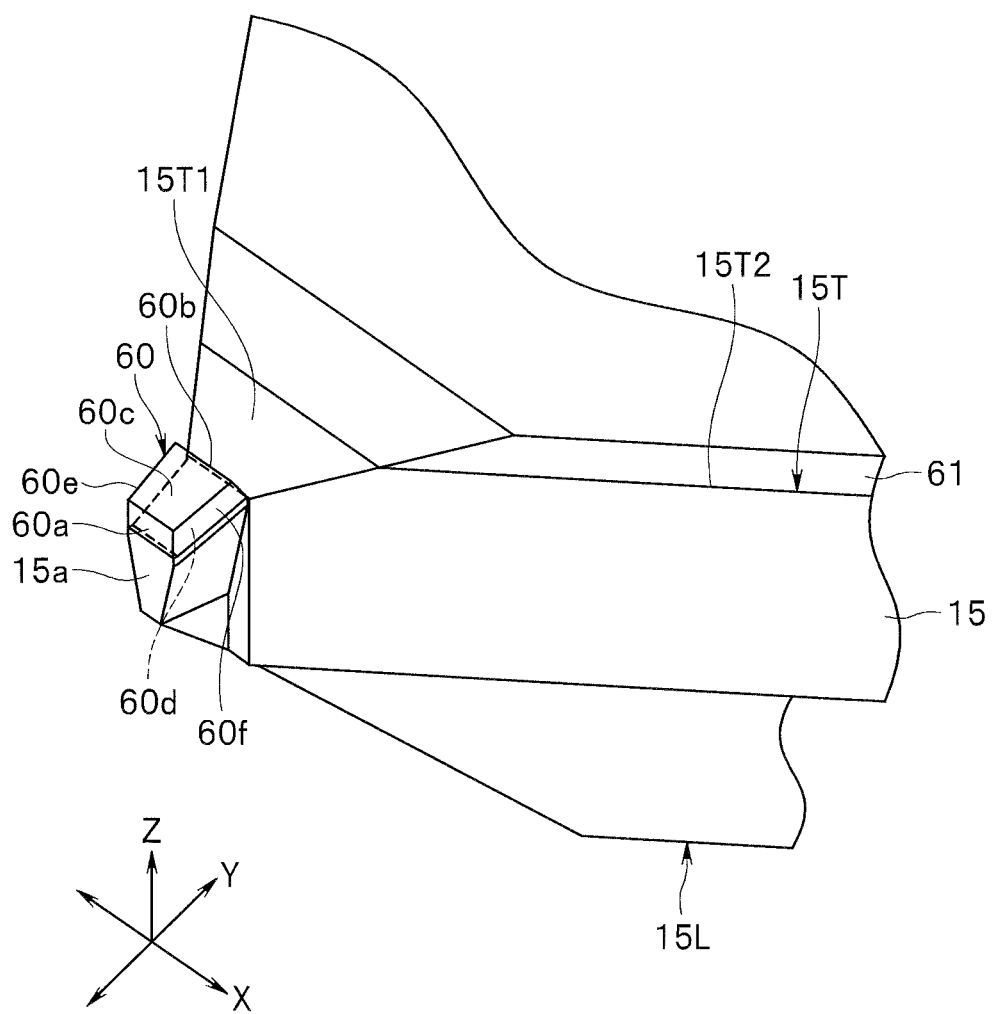
FIG. 1 is a perspective view showing essential parts of a magnetic head according to a first embodiment of the invention.
Figure 2:
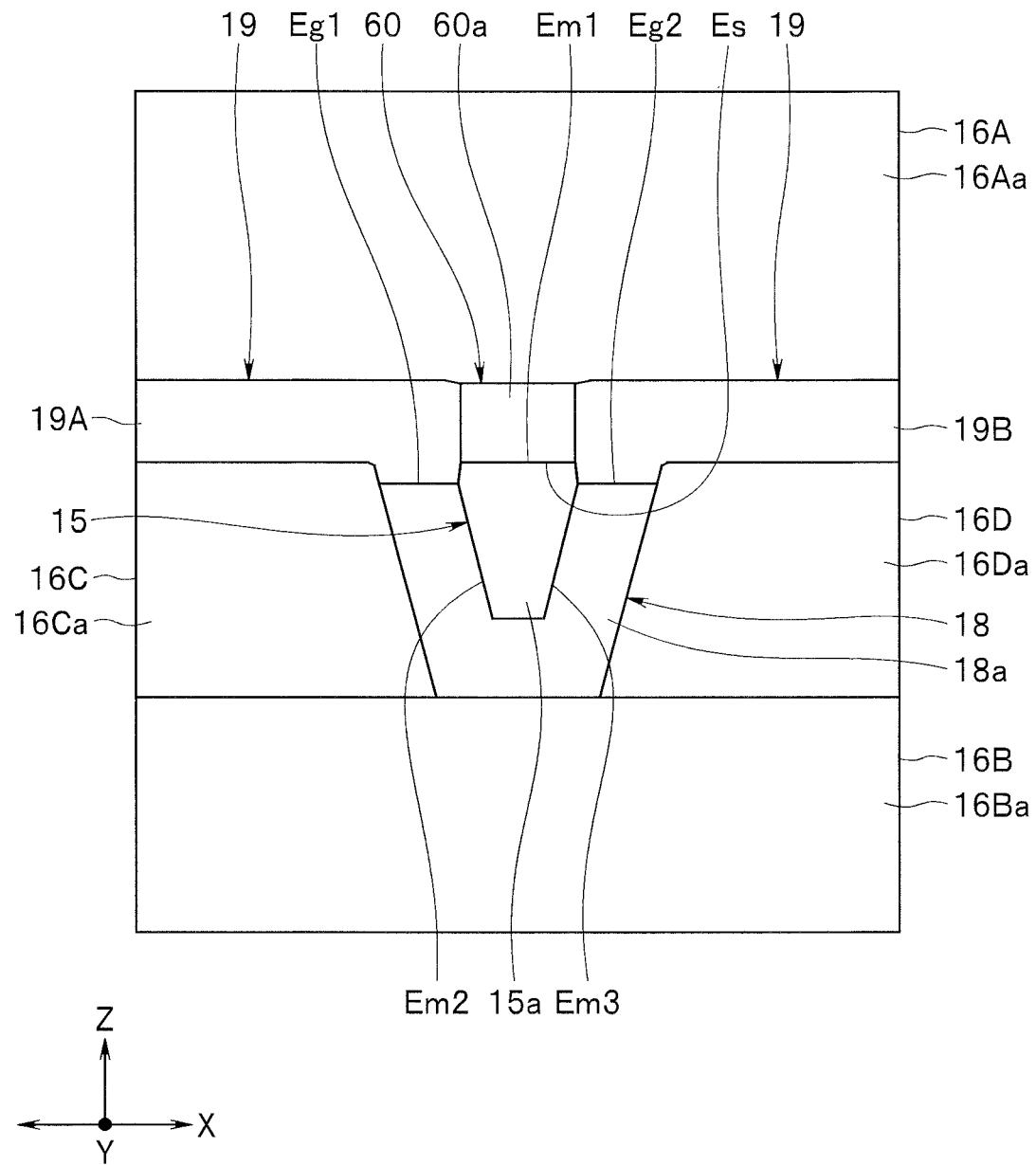
FIG. 2 is a front view showing essential parts of the magnetic head according to the first embodiment of the invention.
Figure 3:
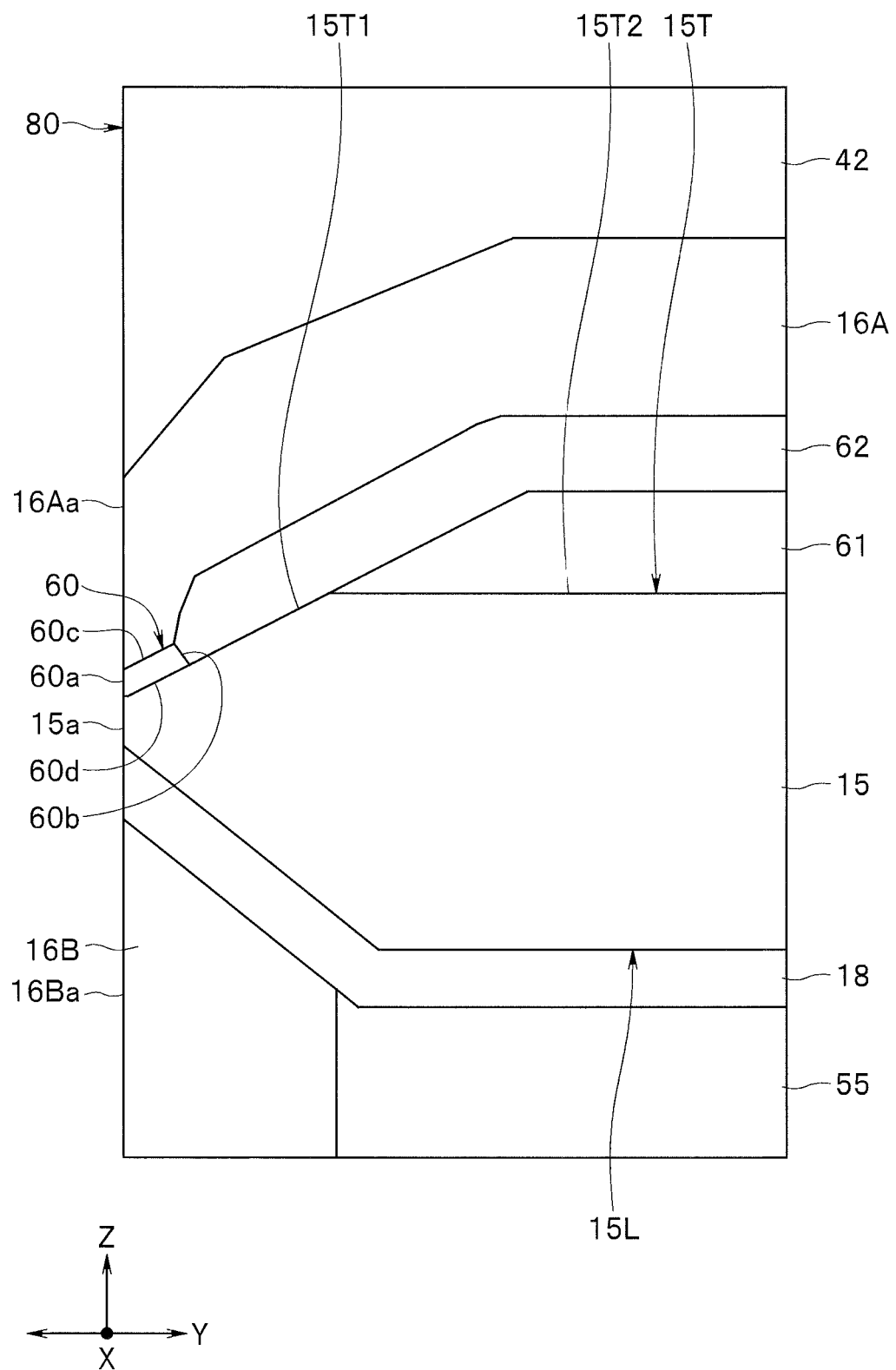
FIG. 3 is a cross-sectional view showing essential parts of the magnetic head according to the first embodiment of the invention.

Now, the shapes and layout of the main pole 15, the first gap layer 18, the second gap layer 19 and the spin torque oscillator 60 will be described in detail with reference to FIGS. 1 to 3, 5, 7, and 8. FIG. 1 is a perspective view showing essential parts of the magnetic head. FIG. 2 is a front view showing essential parts of the magnetic head. FIG. 3 is a cross-sectional view showing essential parts of the magnetic head.

As shown in FIGS. 7 and 8, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As shown in FIGS. 1 and 3, the top surface 15T includes an inclined portion 15T1 and a flat portion 15T2, the inclined portion 15T1 being closer to the medium facing surface 80 than the flat portion 15T2. The inclined portion 15T1 has a first end located in the medium facing surface 80 and a second end opposite thereto. The flat portion 15T2 is connected to the second end of the inclined portion 15T1. The inclined portion 15T1 is inclined such that the second end is located forward relative to the first end in the direction of travel of the recording medium 90 (the Z direction). The flat portion 15T2 extends substantially in a direction perpendicular to the medium facing surface 80 (the Y direction).

As shown in FIG. 3, the bottom end 15L includes a first inclined portion and a first flat portion, the first inclined portion being closer to the medium facing surface 80 than the first flat portion. The first inclined portion has a third end located in the medium facing surface 80, and a fourth end opposite thereto. The first inclined portion may be an edge formed by two intersecting surfaces, or may be a surface connecting two surfaces to each other. The first flat portion is a surface connected to the fourth end of the first inclined portion. The first inclined portion is inclined such that the fourth end is located backward relative to the third end in the direction of travel of the recording medium 90 (the Z direction). The first flat portion extends substantially in a direction perpendicular to the medium facing surface 80 (the Y direction).

As shown in FIG. 5, the bottom end 15L further includes a second inclined portion and a second flat portion. The second inclined portion is a surface connected to the first flat portion. The second flat portion is a surface connected to an end of the second inclined portion, the end being opposite from the first flat portion. The second inclined portion is inclined similarly to the first inclined portion. The second flat portion extends substantially in a direction perpendicular to the medium facing surface 80 (the Y direction), like the first flat portion.

As shown in FIG. 2, the end face 15a of the main pole 15 has a top edge Em1 farthest from the top surface 1a of the substrate 1, a side edge Em2 connected to one end of the top edge Em1, and a side edge Em3 connected the other end of the top edge Em1. In the present embodiment, specifically, the top edge Em1 is in contact with the spin torque oscillator 60. The top edge Em1 defines the track width. The position of an end of a recording bit to be recorded on the recording medium 90 is determined by the position of the top edge Em1. The top edge Em1 has a length in the range of 0.05 to 0.20 µm, for example.

The end face 15a of the main pole 15 includes an upper part and a lower part contiguous with each other. The upper part of the end face 15a includes the top edge Em1. The lower part of the end face 15a is located closer to the top surface 1a of the substrate 1 than the upper part of the end face 15a. The width of the upper part of the end face 15a increases with increasing distance from the top edge Em1, that is, with increasing proximity to the top surface 1a of the substrate 1. The width of the lower part of the end face 15a is equal to that of the upper part of the end face 15a at the boundary between the upper and lower parts of the end face 15a, and decreases with increasing proximity to the top surface 1a of the substrate 1.

Each of the side edges Em2 and Em3 includes a first side included in the upper part of the end face 15a, and a second side included in the lower part of the end face 15a. Each of the second side of the side edge Em2 and the second side of the side edge Em3 forms an angle in the range of, for example, 7° to 17°, preferably in the range of 10° to 15° with respect to a direction perpendicular to the top surface 1a of the substrate 1.

As shown in FIGS. 1 and 3, the spin torque oscillator 60 is disposed on the inclined portion 15T1 of the top surface 15T of the main pole 15. As shown in FIGS. 1 to 3, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the example shown in FIGS. 1 to 3, the front end face 60a is located in the medium facing surface 80. The top surface 60c is in contact with the trailing shield 16A. The bottom surface 60d is in contact with the inclined portion 15T1 of the top surface 15T of the main pole 15. Each of the first side surface 60e and the second side surface 60f forms an angle in the range of 0° to 7° with respect to a direction perpendicular to the top surface 1a of the substrate 1.

As shown in FIG. 2, the front end face 60a of the spin torque oscillator 60 has a bottom edge Es closest to the top surface 1a of the substrate 1. In the example shown in FIG. 2, the width of the top edge Em1 of the end face 15a of the main pole 15 is equal to that of the bottom edge Es of the front end face 60a of the spin torque oscillator 60. The position of the top edge Em1 in the track width direction is the same as that of the bottom edge Es in the track width direction. Note that the width of the top edge Em1 may be slightly different from that of the bottom edge Es. Similarly, the position of the top edge Em1 in the track width direction may be slightly different from that of the bottom edge Es in the track width direction.

As shown in FIGS. 2 and 3, the first gap layer 18 has a gap end face 18a located in the medium facing surface 80. As shown in FIG. 2, the gap end face 18a has two top edges Eg1 and Eg2 lying at the forward end in the direction of travel of the recording medium 90 (the Z direction). The top edges Eg1 and Eg2 are on opposite sides of the end face 15a of the main pole 15 in the track width direction. In the example shown in FIG. 2, the position of the top edges Eg1 and Eg2 in a direction parallel to the direction of travel of the recording medium 90 coincides with the position of the boundary between the upper part and the lower part of the end face 15a of the main pole 15 in that direction.

The first gap layer 18 and the first and second portions 19A and 19B of the second gap layer 19 are present on opposite sides of the end face 15a of the main pole 15 in the track width direction. The first portion 19A and the second portion 19B of the second gap layer 19 are present on opposite sides of the spin torque oscillator 60 in the track width direction, whereas the first gap layer 18 is not.

Reference is now made to FIGS. 7 and 8 to describe the connection relationship between the upper coil portion 20 and the lower coil portion 10 of the coil. As shown in FIG. 7, the lower coil portion 10 has a coil connection 10E electrically connected to the upper coil portion 20. As shown in FIG. 8, the upper coil portion 20 has a coil connection 20S electrically connected to the coil connection 10E of the lower coil portion 10. The coil connection 20S is electrically connected to the coil connection 10E via a first and a second connection layer of columnar shape (not illustrated) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIGS. 7 and 8, the upper coil portion 20 and the lower coil portion 10 are connected in series.

A manufacturing method for the magnetic head according to the present embodiment will now be described. The manufacturing method for the magnetic head according to the present embodiment starts with forming the insulating layer 2, the first read shield layer 3, and the MR element 5 in this order on the substrate 1, as shown in FIGS. 5 and 6. Next, the insulating layer 6 is formed around the MR element 5. The second read shield layer 7, the nonmagnetic layer 71, the middle shield layer 72 and the nonmagnetic layer 73 are then formed in this order over the MR element 5 and the insulating layer 6.

Next, the coupling section 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling section 31 is exposed. Next, the coupling sections 32 and 33 are formed on the coupling section 31 by frame plating, for example. The insulating film 52 is then formed over the entire top surface of the stack. Next, the lower coil portion 10 is formed by frame plating, for example. The insulating layer 53 is then formed over the entire top surface of the stack. The insulating film 52 and the insulating layer 53 are then polished by, for example, CMP, until the lower coil portion 10 and the coupling sections 32 and 33 are exposed.

Next, the coupling section 32 and the insulating layer 53 are etched to form therein an accommodation section to accommodate the coupling section 34. Then, the coupling section 34 is formed to be accommodated in the accommodation section. The insulating layer 54 is then formed over the entire top surface of the stack. Next, the insulating layer 54 is selectively etched to form therein a first opening for exposing the top surface of the coupling section 34 and a second opening for exposing the coil connection 10E (see FIG. 7) of the lower coil portion 10. Then, the leading shield 16B is formed on the coupling section 34 at the position of the first opening, the coupling section 35 is formed on a portion of the insulating layer 54 covering the top surface of the coupling section 33, and the first connection layer (not shown) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling section 35 and the first connection layer are exposed. Then, the leading shield 16B and the nonmagnetic layer 55 are taper-etched in part by, for example, ion beam etching (hereinafter referred to as IBE) so as to provide the top surface of the leading shield 16B with a portion opposed to the first inclined portion (see FIG. 2) of the bottom end 15L of the main pole 15 to be formed later, and provide the top surface of the nonmagnetic layer 55 with a portion opposed to the second inclined portion (see FIG. 5) of the bottom end 15L of the main pole 15 to be formed later. In this etching, the coupling section 35 and the first connection layer are also etched in part.

Next, the side shields 16C and 16D are formed on the leading shield 16B by, for example, frame plating. The first gap layer 18 is then formed to cover the leading shield 16B and the side shields 16C and 16D. When alumina is used as the material of the first gap layer 18, the first gap layer 18 is formed by atomic layer deposition (herein after referred to as ALD), for example. The first gap layer 18 is then selectively etched to form therein an opening for exposing the top surface of the coupling section 35, and an opening for exposing the top surface of the first connection layer. Next, an initial main pole, which is to become the main pole 15 later, and the second connection layer (not shown) are formed by frame plating, for example. The initial main pole and the second connection layer are formed such that their top surfaces are higher in level than portions of the first gap layer 18 that are located on the side shields 16D and 16D.

Next, the first nonmagnetic layer (not shown) is formed over the entire top surface of the stack. The initial main pole, the second connection layer, the first gap layer 18 and the first nonmagnetic layer are then polished by, for example, CMP until the side shields 16C and 16D are exposed. Next, the nonmagnetic layer 61 is formed on the initial main pole. The initial main pole and the nonmagnetic layer 61 are then taper-etched so as to provide the initial main pole with the inclined portion 15T1 (see FIGS. 1 and 3) of the top surface 15T of the main pole 15. This makes the initial main pole into the main pole 15. The side shields 16C and 16D, the first gap layer 18 and the first nonmagnetic layer are also etched in part by this etching.

Figure 16:
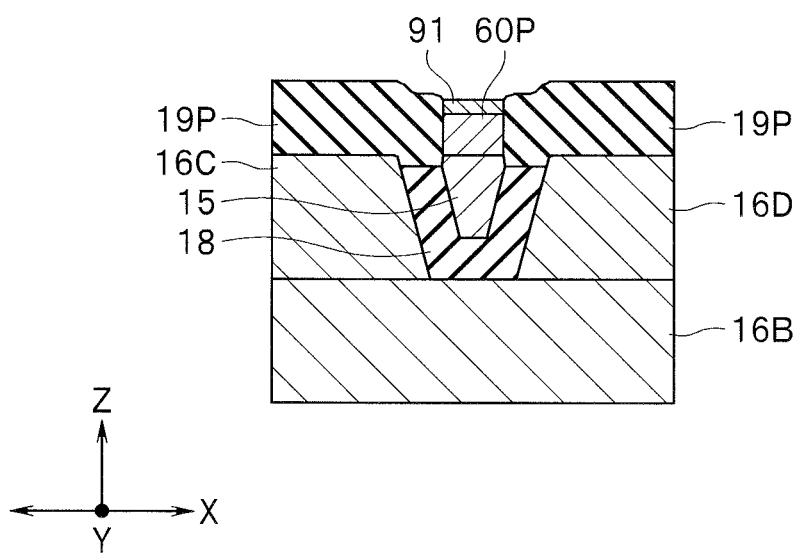
FIG. 16 is a cross-sectional view showing a step that follows the step shown in FIG. 15.
Figure 17:
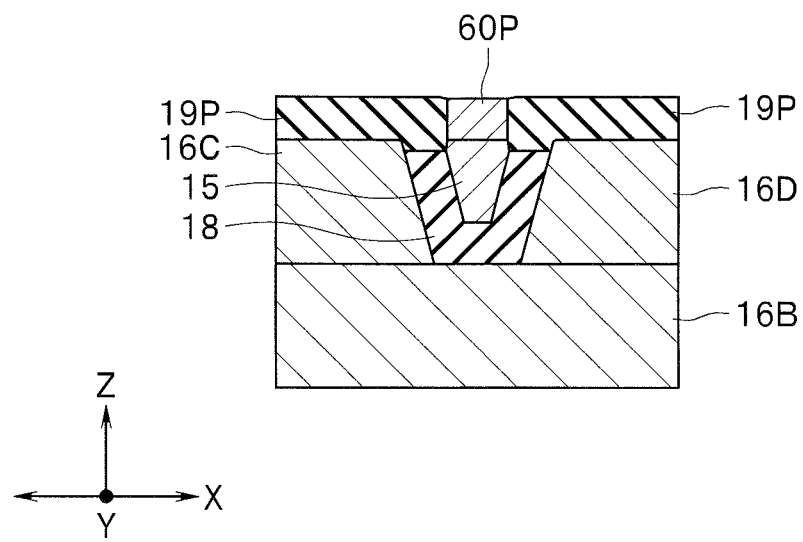
FIG. 17 is a cross-sectional view showing a step that follows the step shown in FIG. 16.
Figure 18:
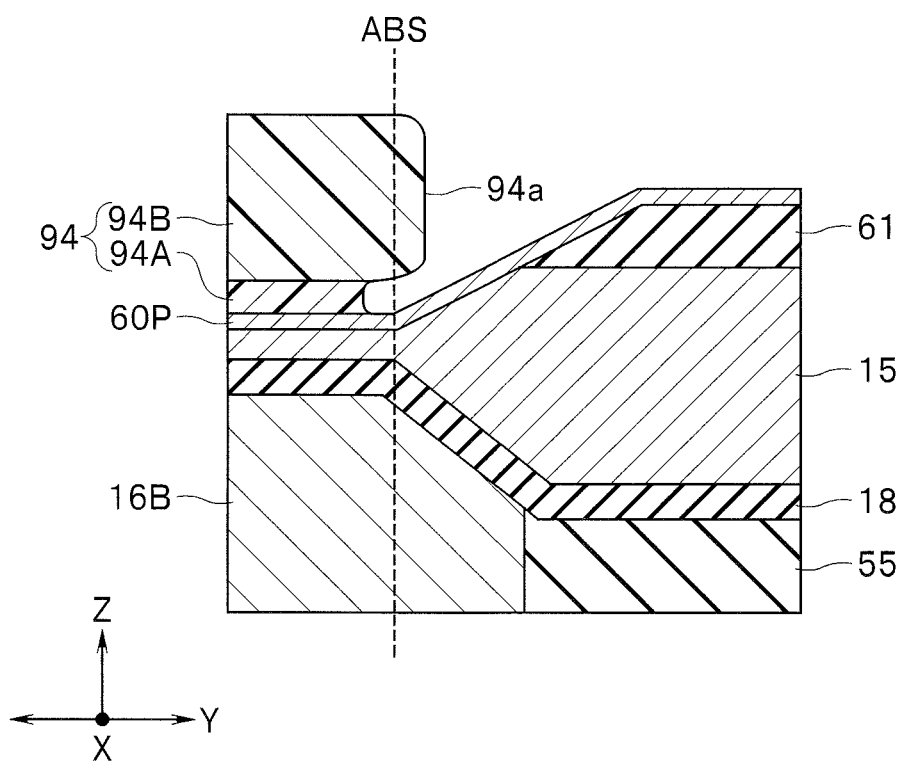
FIG. 18 is a cross-sectional view showing a step that follows the step shown in FIG. 17.
Figure 19:
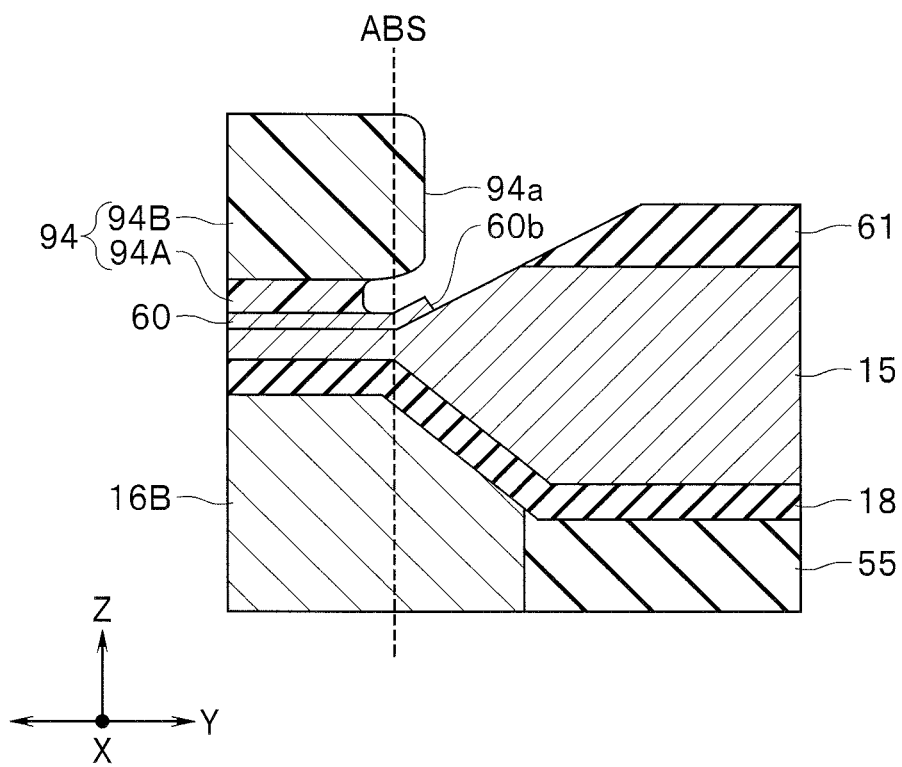
FIG. 19 is a cross-sectional view showing a step that follows the step shown in FIG. 18.

Reference is now made to FIGS. 9 to 20 to describe a series of steps to be performed after the foregoing step up to the formation of the trailing shield 16A. FIGS. 9 to 20 each illustrate a stack of layers formed in the process of manufacturing the magnetic head. FIGS. 9 to 20 omit the illustration of portions that are closer to the substrate 1 relative to the leading shield 16B and the nonmagnetic layer 55. FIGS. 9 to 17 and 20 each illustrate a cross section of the stack taken at the position where the medium facing surface 80 is to be formed. FIGS. 18 and 19 each illustrate a cross section perpendicular to the medium facing surface 80 and the top surface 1a of the substrate 1. In FIGS. 18 and 19, the symbol ABS represents the position where the medium facing surface 80 is to be formed.

Figure 9:
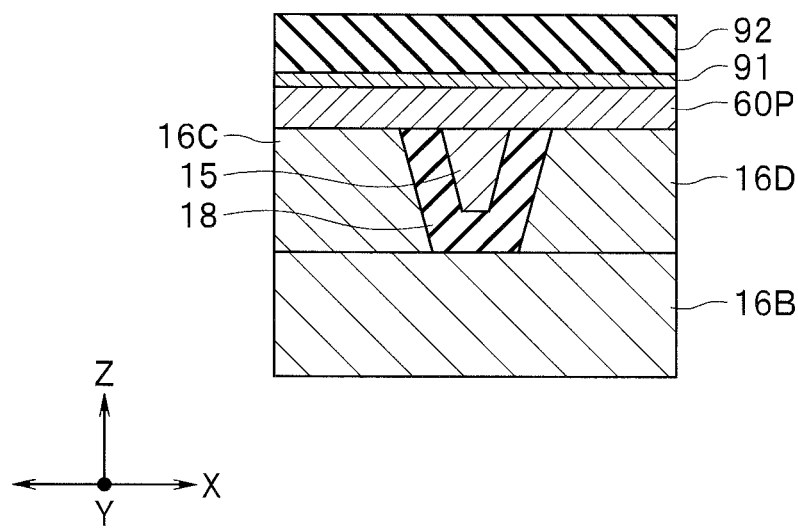
FIG. 9 is a cross-sectional view showing a step of a manufacturing method for the magnetic head according to the first embodiment of the invention.

FIG. 9 shows a step following the formation of the main pole 15. In this step, first, a layered film 60P, which is to become the spin torque oscillator 60 later, is formed on the stack including the main pole 15. As in the example shown in FIG. 4, the spin torque oscillator 60 is composed of a plurality of layers. The layered film 60P includes all the layers to constitute the spin torque oscillator 60.

In the step shown in FIG. 9, a nonmagnetic metal layer 91 of Ru is then formed on the layered film 60P. The nonmagnetic metal layer 91 has a thickness in the range of 5 to 10 nm, for example. Next, an interposition layer 92 is formed on the nonmagnetic metal layer 91. In the present embodiment, specifically, the interposition layer 92 is formed of an inorganic insulating material such as alumina. When alumina is employed as the material of the interposition layer 92, the interposition layer 92 is formed by ALD, for example. In such a case, the thickness of the interposition layer 92 is preferably in the range of 40 to 70 nm, more preferably 50 to 60 nm.

Assume that the first gap layer 18 of alumina is formed by ALD and the interposition layer 92 of alumina is formed by ALD. In such a case, low-temperature ALD, which is a technique to deposit films at lower temperatures compared to normal ALD, is preferably employed to form the interposition layer 92. An example of deposition temperatures in normal ALD is 200° C. An example of deposition temperatures in the low-temperature ALD employed to form the interposition layer 92 falls within the range of 80° C. to 90° C. The first gap layer 18 is formed by ALD at normal deposition temperatures. Hereinafter, the ALD at normal deposition temperatures will be referred to as high-temperature ALD.

Figure 10:
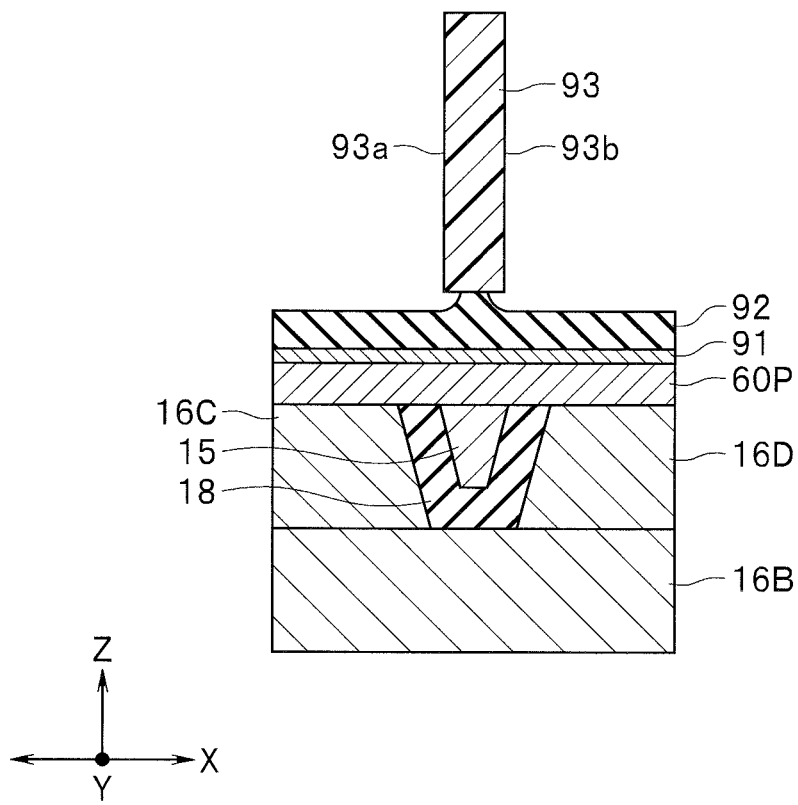
FIG. 10 is a cross-sectional view showing a step that follows the step shown in FIG. 9.

FIG. 10 shows the next step. In this step, first, a photoresist layer of a positive photoresist is formed over the entire top surface of the stack. The photoresist layer is then selectively exposed to light using a photomask. The exposed photoresist layer is then developed. As a result of the exposure, a portion of the photoresist layer that has been irradiated with the light through the light-transmitting portion of the photomask becomes soluble in a developing solution, while the other portion remains insoluble in the developing solution. The photoresist layer remaining after the development makes a mask 93. The mask 93 has a first sidewall 93a for defining the shape and position of the first side surface 60e of the spin torque oscillator 60, and a second sidewall 93b for defining the shape and position of the second side surface 60f of the spin torque oscillator 60. The first and second sidewalls 93a and 93b are perpendicular to the top surface 1a of the substrate 1.

As shown in FIG. 10, the development of the photoresist layer causes part of the interposition layer 92 to be etched away by the developing solution. Of the photoresist layer having undergone the exposure, a portion that has become soluble in the developing solution will be referred to as a soluble portion, and a portion that remains insoluble in the developing solution will be referred to as an insoluble portion. If the interposition layer 92 is made of alumina, a portion of the interposition layer 92 that is covered with the soluble portion of the photoresist layer is reduced in thickness by about 10 to 20 nm by the developing solution. On the other hand, a portion of the interposition layer 92 that is covered with the insoluble portion of the photoresist layer includes a portion not etched by the developing solution. The portion not etched by the developing solution supports the mask 93.

Figure 11:
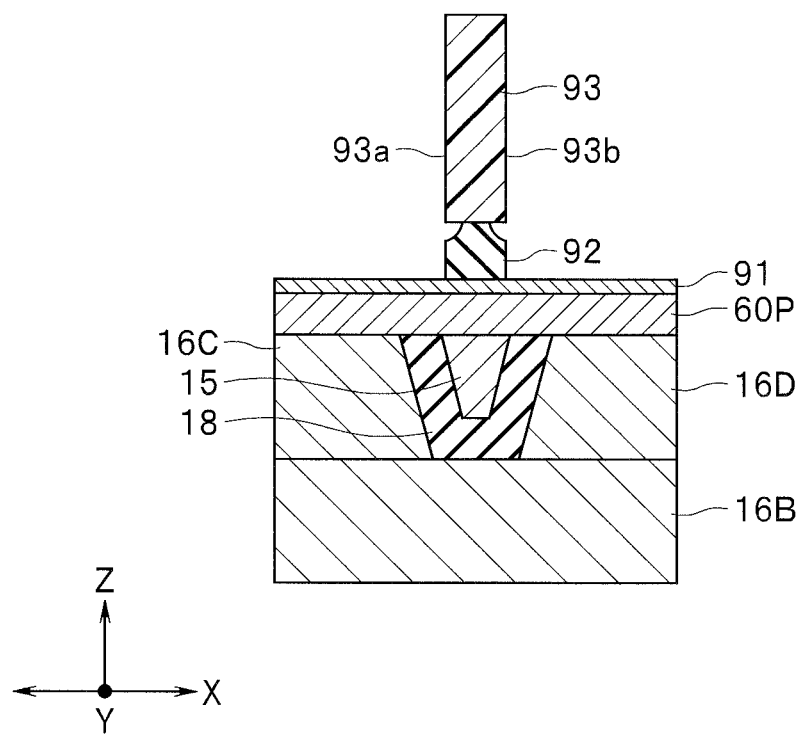
FIG. 11 is a cross-sectional view showing a step that follows the step shown in FIG. 10.

FIG. 11 shows the next step. In this step, a first etching step is performed. The first etching step is a step of etching a portion of the interposition layer 92 using the mask 93. The first etching step is performed by reactive ion etching (hereinafter referred to as RIE), for example. The nonmagnetic metal layer 91 functions as an etching stopper to stop etching when the interposition layer 92 is etched by RIE.

Figure 12:
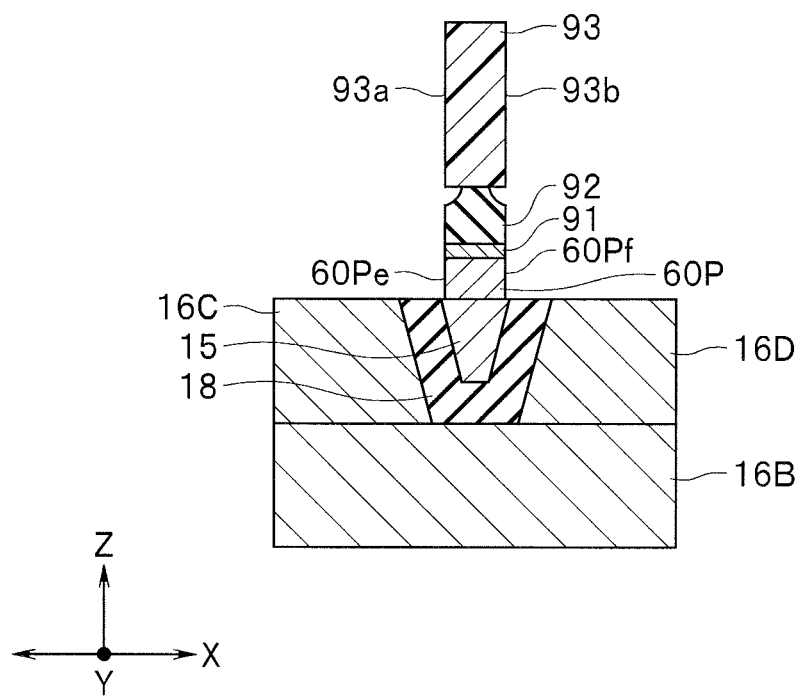
FIG. 12 is a cross-sectional view showing a step that follows the step shown in FIG. 11.

FIG. 12 shows the next step. In this step, a second etching step is performed. The second etching step is a step of etching a portion of the layered film 60P using the mask 93 and the interposition layer 92 as an etching mask. The second etching step etches the layered film 60P in part so as to provide the layered film 60P with the first and second side surfaces 60e and 60f of the spin torque oscillator 60. In FIG. 12 the symbol 60Pe represents a first initial side surface of the layered film 60P including the first side surface 60e, and the symbol 60Pf represents a second initial side surface of the layered film 60P including the second side surface 60f. As shown in FIG. 12, the layered film 60P may be etched so that the width of the etched layered film 60P at the position where the medium facing surface 80 is to be formed will be smaller than the maximum width of the main pole 15.

The second etching step is performed by IBE, for example. When employing IBE, it is preferred that after the layered film 60P is etched with the direction of travel of the ion beams perpendicular to the top surface 1a of the substrate 1, a stack consisting of the layered film 60P, the interposition layer 92 and the mask 93 be etched with the direction of travel of the ion beams inclined with respect to the first and second sidewalls 93a and 93b of the mask 93. In the second etching step, flying substances generated during the etching of the layered film 60P may deposit onto the layered film 60P, the interposition layer 92 and the mask 93 to form a re-deposition film on the surfaces of the layered film 60P, the interposition layer 92 and the mask 93. If IBE is employed, it is possible to eliminate the re-deposition film by inclining the direction of travel of the ion beams as described above. Inclining the direction of travel of the ion beams as described above can also reduce the distance between the first initial side surface 60Pe and the second initial side surface 60Pf to thereby reduce the width of the layered film 60P near the position where the medium facing surface 80 is to be formed.

Figure 13:
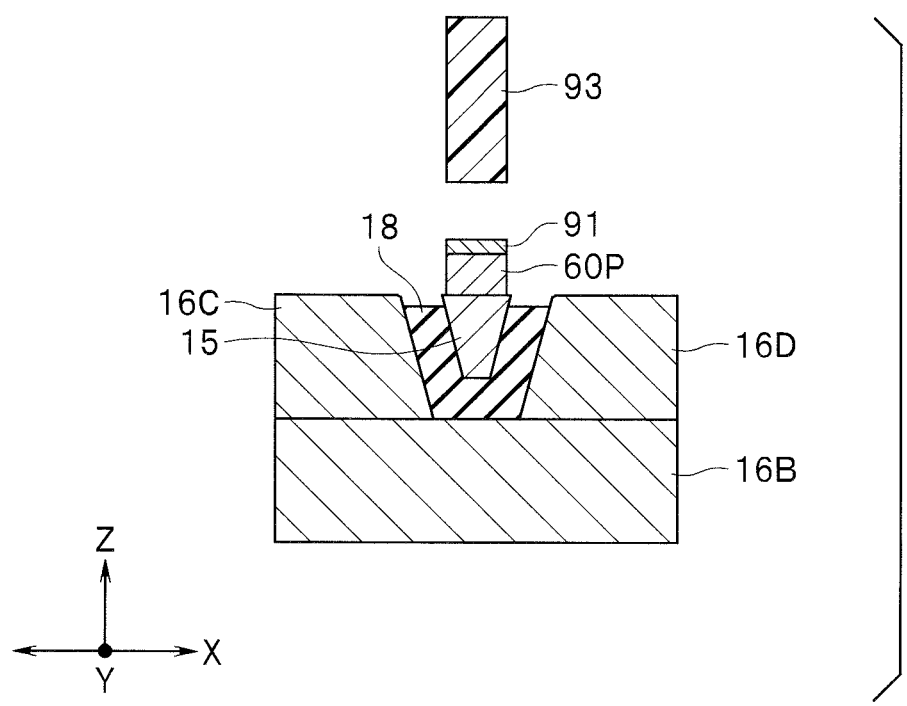
FIG. 13 is a cross-sectional view showing a step that follows the step shown in FIG. 12.

FIG. 13 shows the next step. In this step, a first removal step is performed. The first removal step is a step of removing a portion of the interposition layer 92 that is covered with the mask 93. In the first removal step, a portion of the interposition layer 92 interposed between the layered film 60P and the mask 93 near the position where the medium facing surface 80 is to be formed is removed by wet etching using a developing solution of photolithography, for example. Even if the foregoing portion of the interposition layer 92 is removed, the mask 93 will not peel away since the interposition layer 92 remains between the layered film 60P and the mask 93 except in the vicinity of the position where the medium facing surface 80 is to be formed.

If both of the first gap layer 18 and the interposition layer 92 are formed of alumina, a portion of the first gap layer 18 is also removed when the portion of the interposition layer 92 is removed. Typically, the etching rate of alumina formed by low-temperature ALD is about 4 to 5 times as high as the etching rate of alumina formed by high-temperature ALD. Thus, if the first gap layer 18 is formed by high-temperature ALD and the interposition layer 92 is formed by low-temperature ALD as described above, the etching depth of the top surface of the first gap layer 18 becomes smaller than the thickness of the interposition layer 92. FIG. 13 shows such an example. The etching depth of the top surface of the first gap layer 18 falls within the range of 8 to 12 nm, for example.

Figure 14:
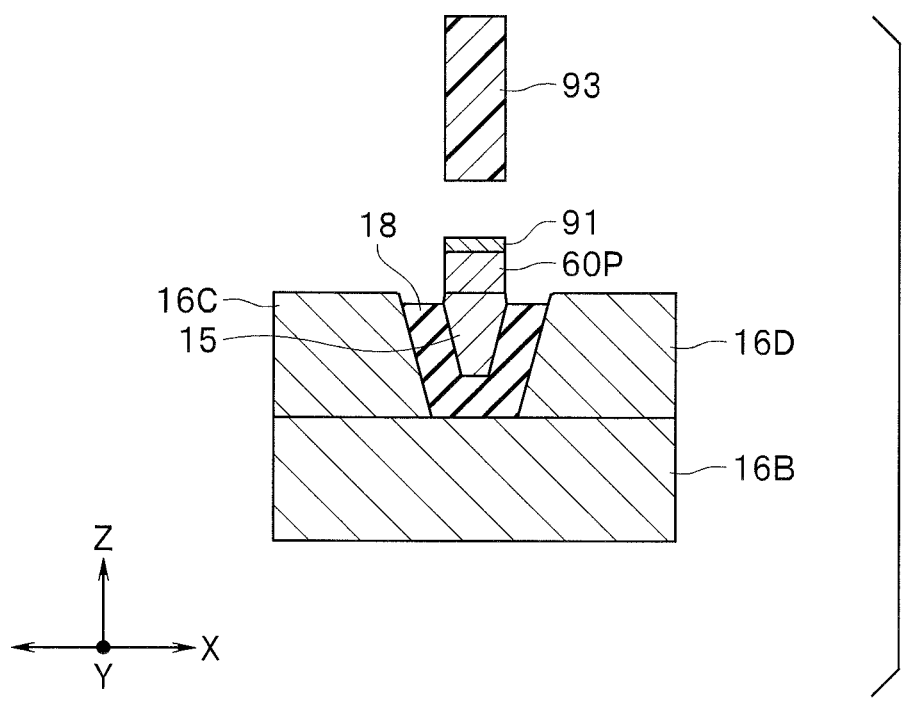
FIG. 14 is a cross-sectional view showing a step that follows the step shown in FIG. 13.

FIG. 14 shows the next step. In this step, a portion of the main pole 15 not covered with the first gap layer 18 or the layered film 60P is etched by, for example, IBE using the layered film 60P and the mask 93 as an etching mask. Typically, an etching rate at a corner is higher than an etching rate at a flat portion. The step shown in FIG. 14 etches corners of the main pole 15, and is thus completed in a relatively short time.

Figure 15:
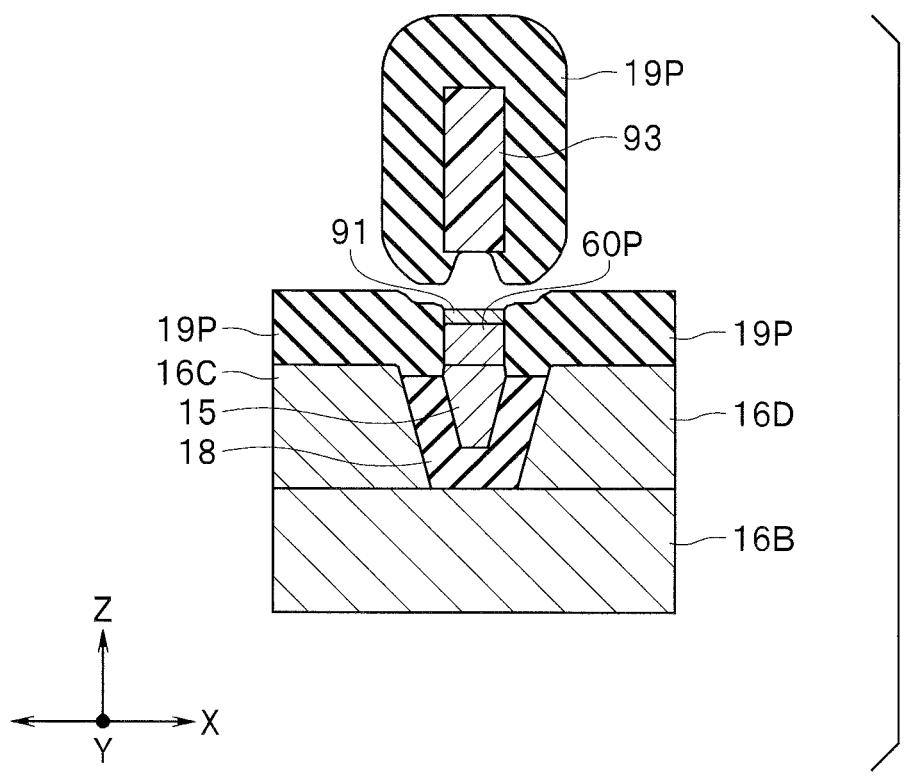
FIG. 15 is a cross-sectional view showing a step that follows the step shown in FIG. 14.

FIG. 15 shows the next step. In this step, with the mask 93 left intact, a nonmagnetic layer 19P for forming the second gap layer 19 is formed over the first gap layer 18 and the side shields 16C and 16D by ion beam deposition, for example. The nonmagnetic layer 19P is formed also on the surface of the mask 93.

FIG. 16 shows the next step. In this step, a second removal step is performed. The second removal step is a step of removing the remainder of the interposition layer 92 and the mask 93. In the removal step, the remainder of the interposition layer 92 is removed and the mask 93 is lifted off by, for example, wet etching using a developing solution of photolithography.

FIG. 17 shows the next step. In this step, the nonmagnetic metal layer 91 is removed and the top surface of the nonmagnetic layer 19P is etched by, for example, IBE.

FIG. 18 shows the next step. In this step, an etching mask 94 is formed on the layered film 60P. The etching mask 94 has an undercut. The etching mask 94 includes, for example, a lower layer 94A lying on the layered film 60P and an upper layer 94B lying on the lower layer 94A. The upper layer 94B is formed of a photoresist patterned by photolithography. The lower layer 94A is formed of, for example, a material that dissolves in a developing solution used in patterning the upper layer 94B. The etching mask 94 has a sidewall 94a for defining the shape and position of the rear end face 60b of the spin torque oscillator 60.

FIG. 19 shows the next step. In this step, a patterning step is performed. The patterning step is a step of patterning the layered film 60P into the spin torque oscillator 60. In the patterning step, the layered film 60P is etched by, for example, IBE using the etching mask 94 so as to provide the layered film 60P with the rear end face 60b of the spin torque oscillator 60. This etching is performed until the main pole 15 and the nonmagnetic layer 61 are exposed. A portion of the first initial side surface 60Pe of the layered film 60P remaining after the etching becomes the first side surface 60e of the spin torque oscillator 60. A portion of the second initial side surface 60Pf of the layered film 60P remaining after the etching becomes the second side surface 60f of the spin torque oscillator 60. The layered film 60P thereby becomes the spin torque oscillator 60.

In the step shown in FIG. 19, the insulating layer 62 is then formed over the entire top surface of the stack with the etching mask 94 left intact. The etching mask 94 is then lifted off.

Figure 20:
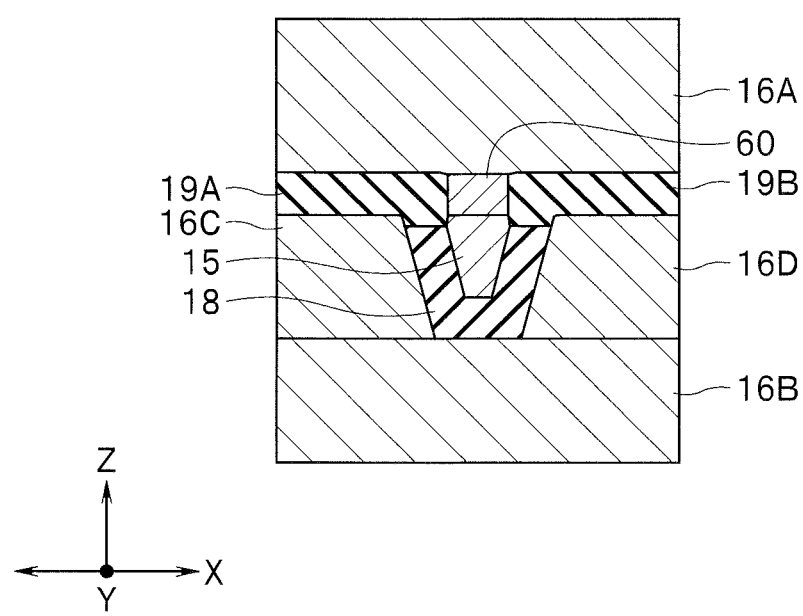
FIG. 20 is a cross-sectional view showing a step that follows the step shown in FIG. 19.

FIG. 20 shows the next step. In this step, first, the nonmagnetic layer 19P is selectively etched so that the top surfaces of the side shields 16C and 16D are exposed in part. This forms the first and second portions 19A and 19B of the second gap layer 19. Next, the trailing shield 16A is formed over the side shields 16C and 16D, the second gap layer 19, the spin torque oscillator 60 and the insulating layer 62 by frame plating, for example.

Steps following the formation of the trailing shield 16A will be described below with reference to FIGS. 5 and 6. First, the nonmagnetic layer 61 and the insulating layer 62 are selectively etched by, for example, IBE so that the second portion of the top surface 15T of the main pole 15 is exposed. Then, the coupling section 41 is formed on the main pole 15 and the coupling section 42 is formed on the trailing shield 16A by, for example, frame plating. Next, the insulating film 63 is formed over the entire top surface of the stack.

The insulating film 63 is then selectively etched to form therein an opening for exposing the top surface of the second connection layer. Next, the upper coil portion 20 is formed by frame plating, for example. The second nonmagnetic layer (not shown) is then formed over the entire top surface of the stack. The insulating film 63 and the second nonmagnetic layer are then polished by, for example, CMP, until the upper coil portion 20 and the coupling sections 41 and 42 are exposed.

Next, the insulating layer 64 is formed over the entire top surface of the stack. Then, the insulating layer 64 is selectively etched to form therein an opening for exposing the top surface of the coupling section 42, and the top surface of a portion of the insulating layer 64 covering the top surface of the coupling section 41 is also etched. The coupling section 43 is then formed by frame plating, for example. Next, the protective layer 70 is formed over the entire top surface of the stack. For example, the step of forming the wirings 83 and 84 is performed simultaneously with a series of steps from the step of forming the main pole 15 to the step of forming the protective layer 70.

Wiring and a plurality of terminals including the terminals 81 and 82 are then formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head.

As has been described, the manufacturing method for the magnetic head according to the present embodiment includes the steps of: forming the main pole 15; forming the spin torque oscillator 60 after the main pole 15 is formed; and forming the trailing shield 16A after the spin torque oscillator 60 is formed. The step of forming the spin torque oscillator 60 includes: the step of forming the layered film 60P on the main pole 15, the layered film 60P becoming the spin torque oscillator 60 later; the step of forming the interposition layer 92 on the layered film 60P; the step of forming the mask 93 on the interposition layer 92; the first etching step of etching a portion of the interposition layer 92 using the mask 93; the second etching step of etching a portion of the layered film 60P using the mask 93 and the interposition layer 92 as an etching mask after the first etching step; the step of removing the interposition layer 92 and the mask 93 after the second etching step; and the patterning step of patterning the layered film 60P into the spin torque oscillator 60 after the interposition layer 92 and the mask 93 are removed.

The step of removing the interposition layer 92 and the mask 93 includes the first removal step of removing a portion of the interposition layer 92 that is covered with the mask 93, and the second removal step of removing the remainder of the interposition layer 92 and the mask 93. The manufacturing method for the magnetic head according to the present embodiment further includes the step of forming the nonmagnetic layer 19P with the mask 93 left intact after the first removal step and before the second removal step.

According to the present embodiment, after the interposition layer 92 is partly etched using the mask 93, the layered film 60P is partly etched using the mask 93 and the interposition layer 92 as an etching mask. This makes it possible to prevent a reduction in the contact area between the spin torque oscillator 60 and the trailing shield 16A. Such an effect will now be described with reference to comparisons with a manufacturing method of a magnetic head of a comparative example.

FIGS. 21 to 24 show a stack of layers formed in the process of manufacturing the magnetic head of the comparative example. FIGS. 21 to 24 omit the illustration of portions that are closer to the substrate 1 relative to the leading shield 16B and the nonmagnetic layer 55. FIGS. 21 to 24 each illustrate a cross section of the stack taken at the position where the medium facing surface 80 is to be formed.

Figure 21:
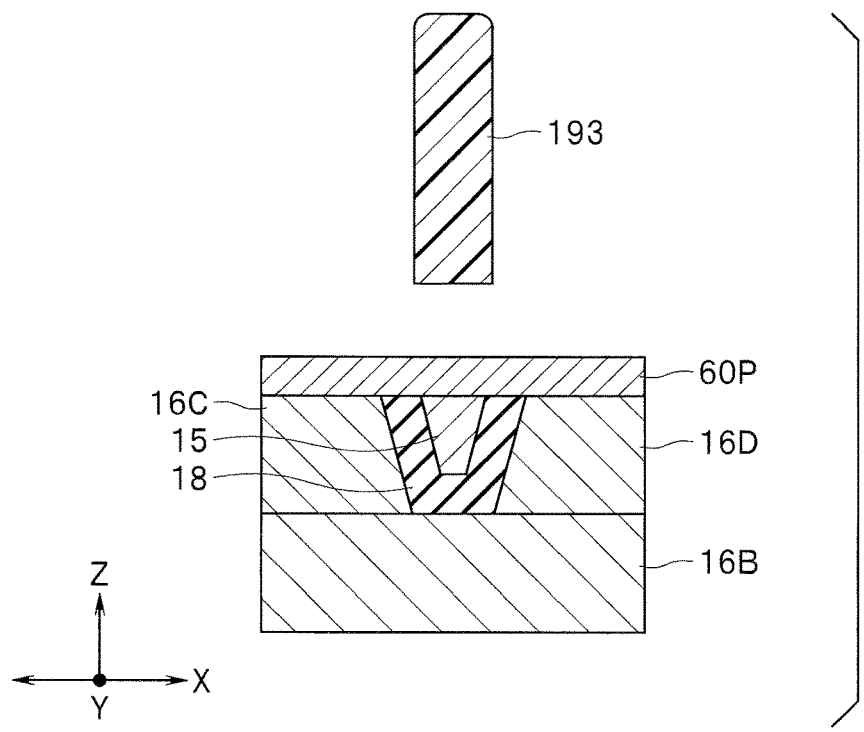
FIG. 21 is a cross-sectional view showing a step of a manufacturing method for a magnetic head of a comparative example.

The manufacturing method for the magnetic head of the comparative example is the same as the manufacturing method for the magnetic head according to the present embodiment up to the step of forming the layered film 60P. FIG. 21 shows a step following the formation of the layered film 60P. In this step, first, an etching mask 193 is formed on the layered film 60P. The etching mask 193 is the same in plane shape (the shape as viewed from above) as the mask 93 of the present embodiment. The etching mask 193 has an undercut. The etching mask 193 includes, for example, a lower layer lying on the layered film 60P and an upper layer lying on the lower layer. The upper layer is formed of a photoresist patterned by photolithography. The lower layer is formed of, for example, a material that dissolves in a developing solution used in patterning the upper layer.

When the upper layer is patterned, a portion of the lower layer interposed between the layered film 60P and the upper layer near the position where the medium facing surface 80 is to be formed is removed. As a result, as shown in FIG. 21, a gap is formed between the layered film 60P and the etching mask 193 near the position where the medium facing surface 80 is to be formed. Note that even if the foregoing portion of the lower layer is removed, the etching mask 193 will not peel away since the lower layer remains between the layered film 60P and the upper layer except in the vicinity of the position where the medium facing surface 80 is to be formed.

Figure 22:
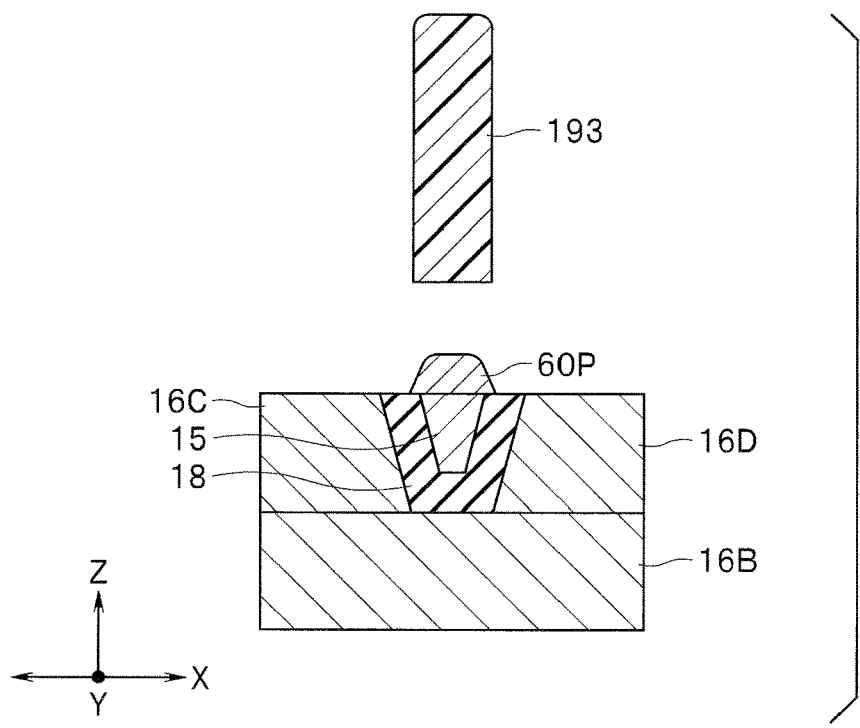
FIG. 22 is a cross-sectional view showing a step that follows the step shown in FIG. 21.

FIG. 22 shows the next step. In this step, a portion of the layered film 60P is etched using the etching mask 193. This etching is performed by IBE. In this etching, after the layered film 60P is etched with the direction of travel of the ion beams perpendicular to the top surface 1a of the substrate 1, a stack consisting of the layered film 60P and the etching mask 193 is etched with the direction of travel of the ion beams inclined in order to eliminate a re-deposition film.

Figure 23:
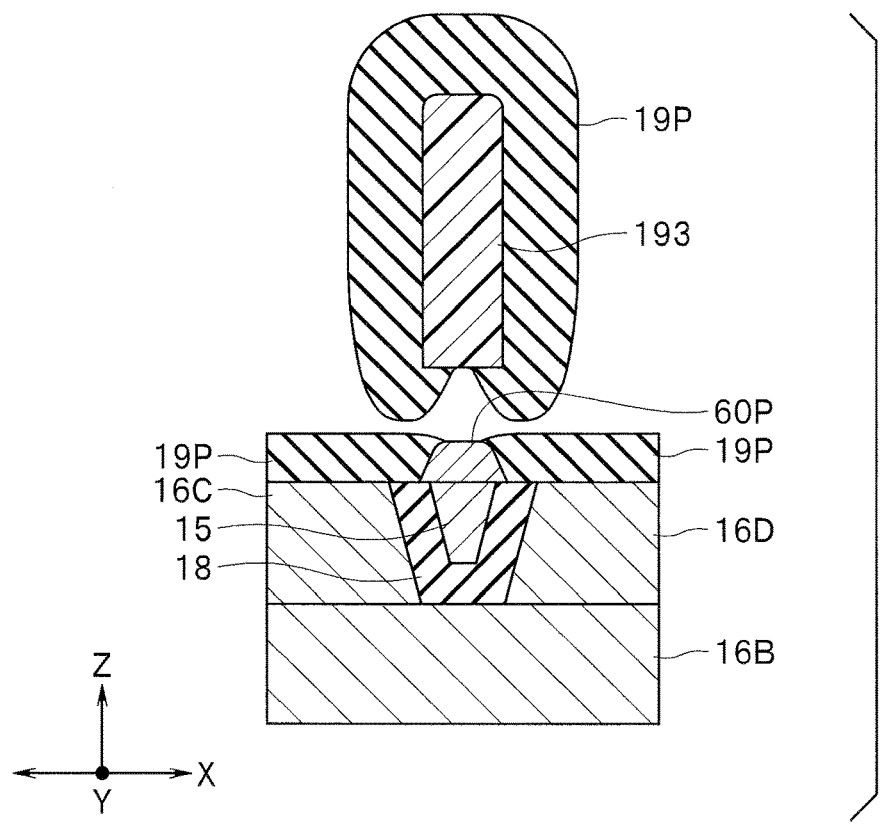
FIG. 23 is a cross-sectional view showing a step that follows the step shown in FIG. 22.

FIG. 23 shows the next step. In this step, with the etching mask 193 left intact, a nonmagnetic layer 19P for forming the second gap layer 19 is formed over the first gap layer 18 and the side shields 16C and 16D by ion beam deposition, for example. The nonmagnetic layer 19P is formed also on the surface of the etching mask 193.

Figure 24:
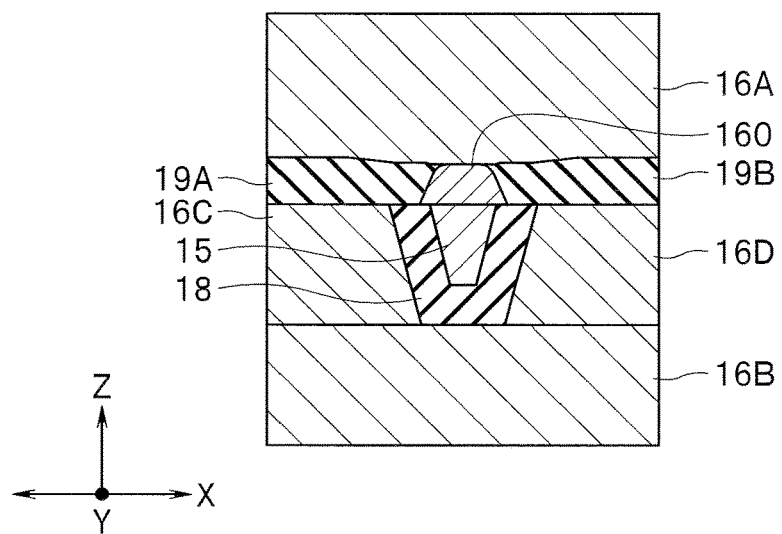
FIG. 24 is a cross-sectional view showing a step that follows the step shown in FIG. 23.

FIG. 24 shows the next step. In this step, first, the etching mask 193 is lifted off. Next, an etching mask (not shown) having the same plane shape as that of the etching mask 94 of the present embodiment is formed on the layered film 60P. The layered film 60P is then etched using the etching mask. This makes the layered film 60P into a spin torque oscillator 160 of the comparative example. Next, the insulating layer 62 is formed over the entire top surface of the stack with the etching mask left intact. The etching mask is then lifted off.

Next, the nonmagnetic layer 19P is selectively etched so that the top surfaces of the side shields 16C and 16D are exposed in part. The first and second portions 19A and 19B of the second gap layer 19 are thereby formed. Then, the trailing shield 16A is formed over the side shields 16C and 16D, the second gap layer 19, the spin torque oscillator 160 and the insulating layer 62 by frame plating, for example. The subsequent steps are the same as those of the manufacturing method for the magnetic head according to the present embodiment.

Figure 25:
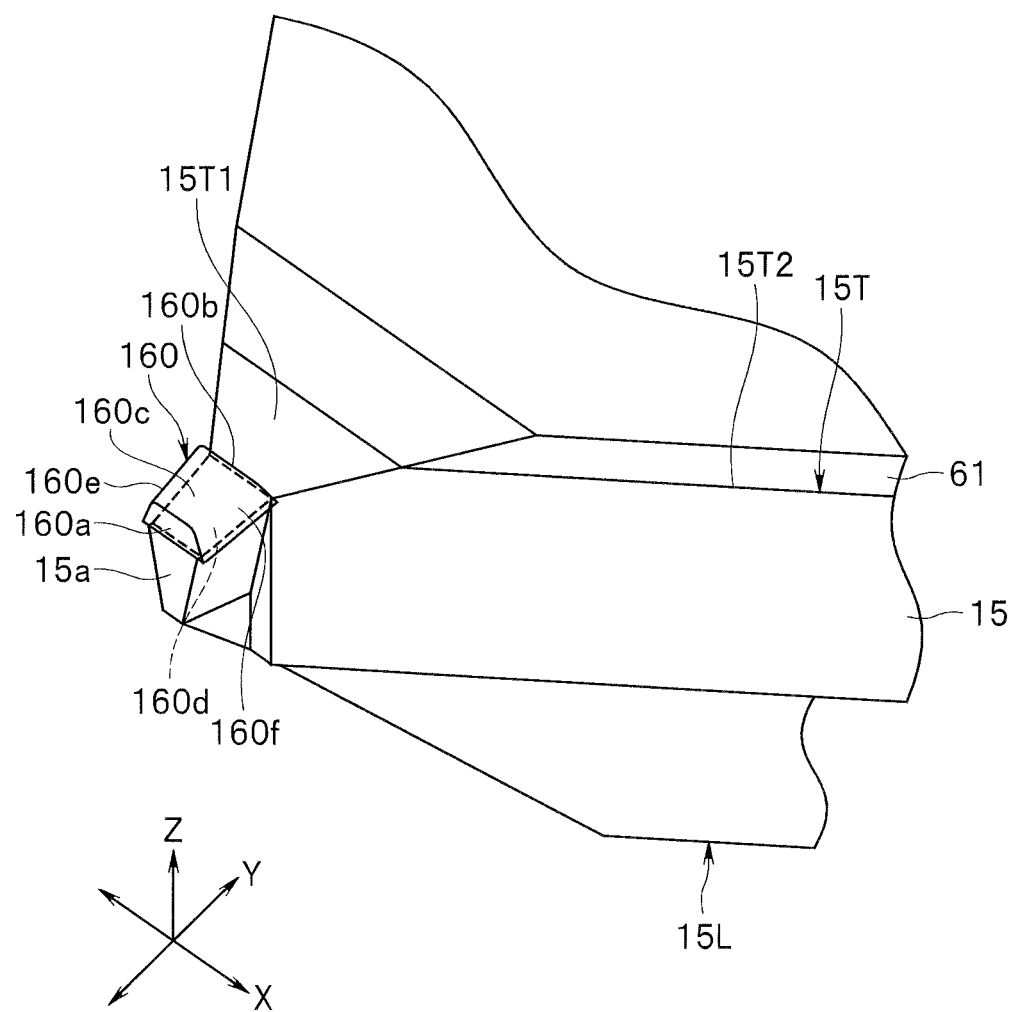
FIG. 25 is a perspective view showing essential parts of the magnetic head of the comparative example.

FIG. 25 is a perspective view showing essential parts of the magnetic head of the comparative example manufactured by the manufacturing method of the comparative example. The spin torque oscillator 160 of the comparative example has a front end face 160a located in the medium facing surface 80, a rear end face 160b farthest from the medium facing surface 80, a top surface 160c farthest from the top surface 1a of the substrate 1, a bottom surface 160d closest to the top surface 1a of the substrate 1, and a first side surface 160e and a second side surface 160f opposite to each other in the track width direction (the X direction). The top surface 160c is in contact with the trailing shield 16A. The bottom surface 160d is in contact with the inclined portion 15T1 of the top surface 15T of the main pole 15.

In the manufacturing method of the comparative example, the stack consisting of the layered film 60P and the etching mask 193 is etched with the direction of travel of ion beams inclined in order to eliminate a re-deposition film in the presence of a gap between the layered film 60P and the etching mask 193 near the position where the medium facing surface 80 is to be formed. Accordingly, the manufacturing method of the comparative example causes the layered film 60P to be taper-etched. As a result, the first side surface 160e and the second side surface 160f each become greatly inclined with respect to a direction perpendicular to the top surface 1a of the substrate 1. The angle that the first side surface 160e forms with respect to a direction perpendicular to the top surface 1a of the substrate 1 is greater than the angle that the first side surface 60e of the spin torque oscillator 60 of the present embodiment forms with respect to a direction perpendicular to the top surface 1a of the substrate 1. Similarly, the angle that the second side surface 160f forms with respect to a direction perpendicular to the top surface 1a of the substrate 1 is greater than the angle that the second side surface 60f of the spin torque oscillator 60 of the present embodiment forms with respect to a direction perpendicular to the top surface 1a of the substrate 1.

In the spin torque oscillator 160 of the comparative example, the top surface 160c is smaller in width than the bottom surface 160d because the first side surface 160e and the second side surface 160f are inclined. Accordingly, in the magnetic head of the comparative example, the contact area between the spin torque oscillator 160 and the trailing shield 16A is smaller than the contact area between the spin torque oscillator 160 and the main pole 15. The magnetic head of the comparative example thus has the problem that if a higher voltage is applied to the spin torque oscillator 160, the spin torque oscillator 160 generates heat and as a result, the life of the magnetic head is shortened. This problem becomes more significant as the width of the spin torque oscillator 160 decreases.

In the present embodiment, in contrast, a portion of the layered film 60P is etched using the mask 93 and the interposition layer 92 as an etching mask. Thus, according to the present embodiment, it is possible to etch the stack consisting of the layered film 60P and the mask 93 with the direction of travel of ion beams inclined in order to eliminate a re-deposition film in the presence of the interposition layer 92 between the layered film 60P and the mask 93. The present embodiment thus prevents the layered film 60P from being taper-etched, and consequently prevents the first and second side surfaces 60e and 60f of the spin torque oscillator 60 from becoming inclined. This makes it possible to prevent the width of the top surface 60c of the spin torque oscillator 60 from becoming smaller than the width of the bottom surface 60d of the spin torque oscillator 60, and to thereby prevent a reduction in the contact area between the spin torque oscillator 60 and the trailing shield 16A.

Furthermore, according to the present embodiment, by etching the stack consisting of the layered film 60P and the mask 93 with the direction of travel of ion beams inclined in the presence of the interposition layer 92 between the layered film 60P and the mask 93, it is possible to freely control the width of the layered film 60P near the position where the medium facing surface 80 is to be formed, while preventing the layered film 60P from being taper-etched.

In the present embodiment, as has been described with reference to FIG. 14, a portion of the main pole 15 not covered with the first gap layer 18 and the layered film 60P is etched using the layered film 60P and the mask 93 as an etching mask. According to the present embodiment, as shown in FIG. 2, it is thereby possible to make the width of the top edge Em1 of the end face 15a of the main pole 15 equal to the width of the bottom edge Es of the front end face 60a of the spin torque oscillator 60, and to make the position of the top edge Em1 in the track width direction the same as the position of the bottom edge Es in the track width direction. The present embodiment thereby makes it possible to prevent changes in characteristics caused by misalignment between the main pole 15 and the spin torque oscillator 60 in the track width direction. Furthermore, in the present embodiment, it is possible to reduce the width of the layered film 60P near the position where the medium facing surface 60 is to be formed, while preventing the layered film 60P from being taper-etched. Consequently, the present embodiment makes it possible to reduce the width of the top edge Em1 by reducing the width of the layered film 60P, and to thereby provide a smaller track width.

Second Embodiment

Next, a manufacturing method for a magnetic head according to a second embodiment of the invention will be described with reference to FIGS. 26 to 30. FIGS. 26 to 30 each illustrate a stack of layers formed in the process of manufacturing the magnetic head according to the present embodiment. FIGS. 26 to 30 omit the illustration of portions that are closer to the substrate 1 (see FIGS. 5 and 6) relative to the leading shield 16B. FIGS. 26 to 30 each illustrate a cross section of the stack taken at the position where the medium facing surface 80 is to be formed.

Figure 26:
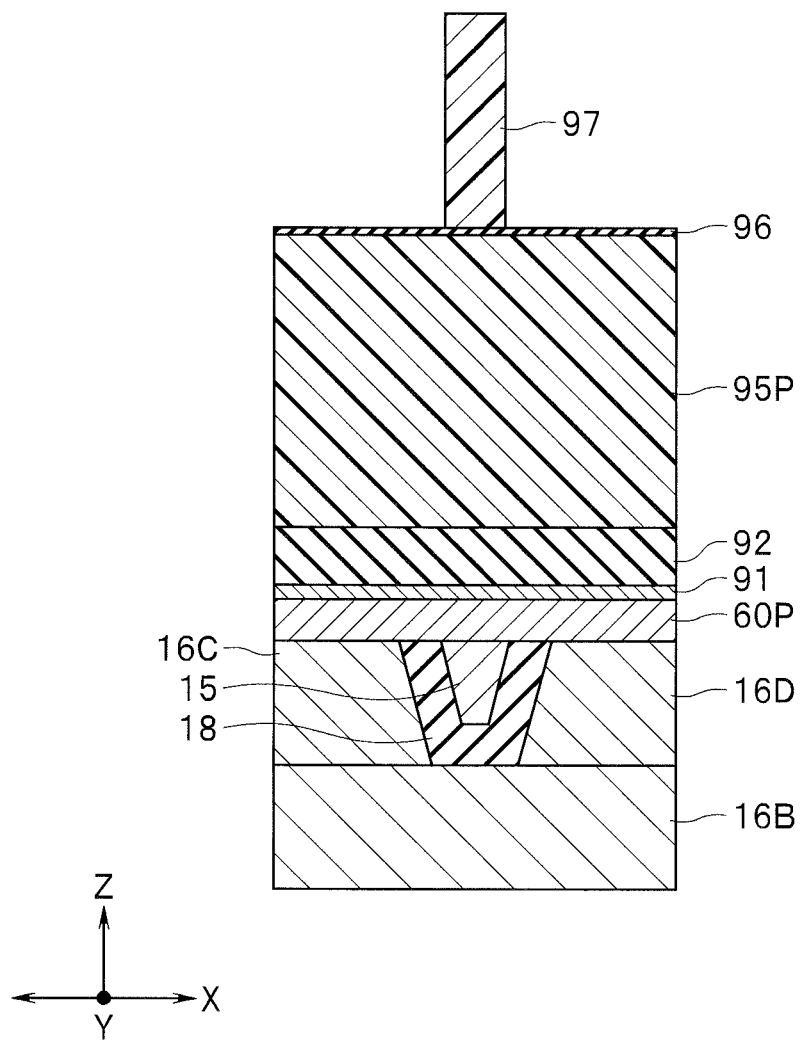
FIG. 26 is a cross-sectional view showing a step of a manufacturing method for a magnetic head according to a second embodiment of the invention.

The manufacturing method for the magnetic head according to the present embodiment is the same as the first embodiment up to the step of forming the interposition layer 92. FIG. 26 shows a step following the formation of the interposition layer 92. In this step, first, an initial mask 95P is formed on the interposition layer 92. The initial mask 95P is to become a mask for etching a portion of the layered film 60P later. The initial mask 95P is formed by first forming a photoresist layer of a negative photoresist over the entire top surface of the stack and then curing the photoresist layer by heating at temperatures in the range of, for example, 180° C. to 200° C.

Next, a separating film 96 of a nonmagnetic material is formed on the initial mask 95P. For example, Ta or alumina is used as the material of the separating film 96. An etching mask 97 of a positive photoresist is then formed on the separating film 96.

Figure 27:
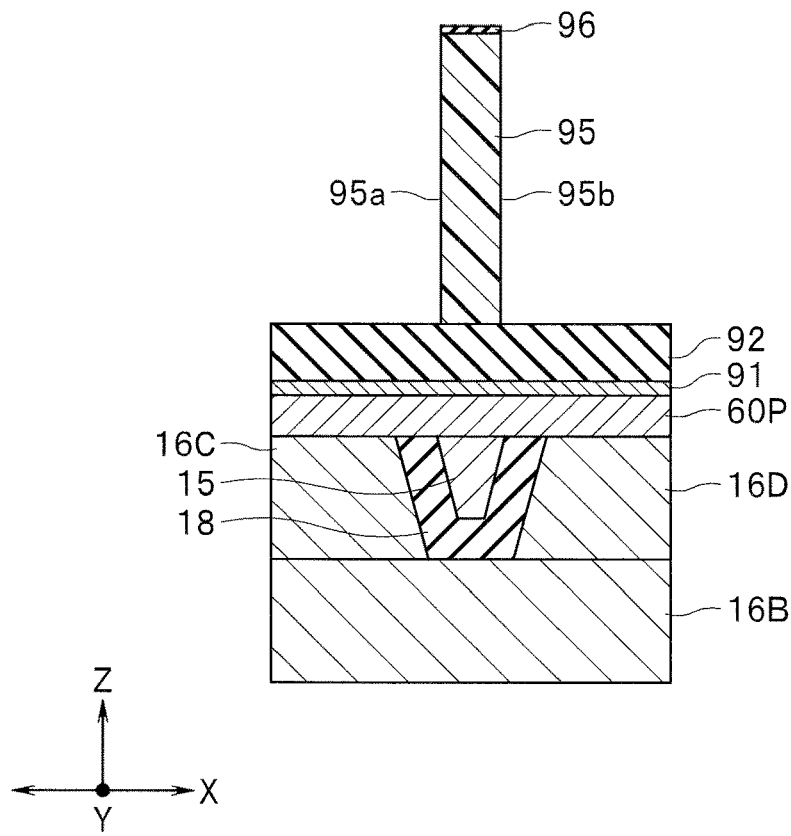
FIG. 27 is a cross-sectional view showing a step that follows the step shown in FIG. 26.

FIG. 27 shows the next step. In this step, first, the initial mask 95P and the separating film 96 are etched by, for example, RIE using the etching mask 97 to as to make the initial mask 95P into a mask 95. The mask 95 has a first sidewall 95a for defining the shape and position of the first side surface 60e of the spin torque oscillator 60, and a second sidewall 95b for defining the shape and position of the second side surface 60f of the spin torque oscillator 60. The first and second sidewalls 95a and 95b are perpendicular to the top surface 1a of the substrate 1. The etching mask 97 is then removed.

Figure 28:
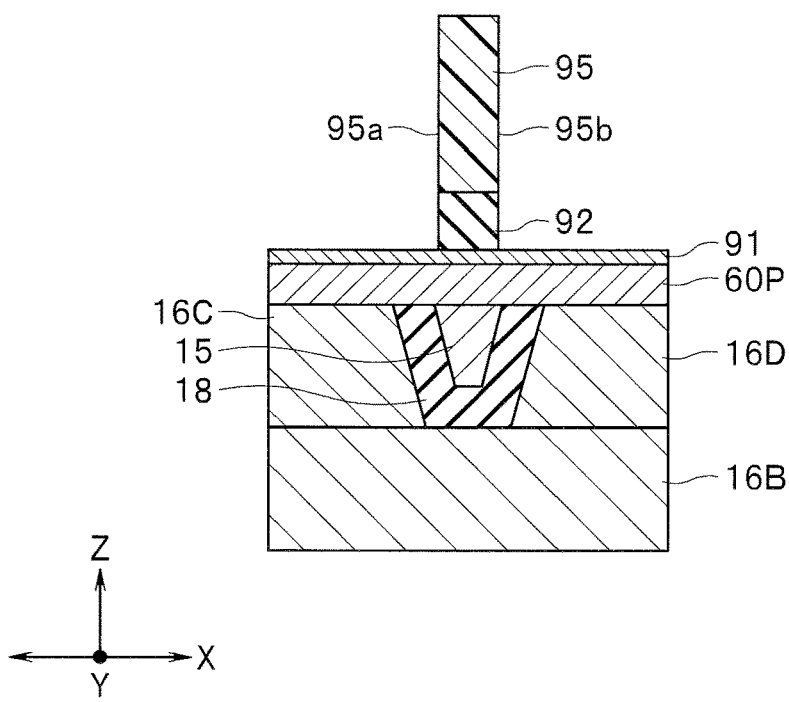
FIG. 28 is a cross-sectional view showing a step that follows the step shown in FIG. 27.

FIG. 28 shows the next step. In this step, a first etching step is performed. The first etching step in the present embodiment is a step of etching a portion of the interposition layer 92 using the mask 95. The first etching step is performed by RIE, for example. In the first etching step, a portion of the mask 95 and the separating film 96 are also etched.

Figure 29:
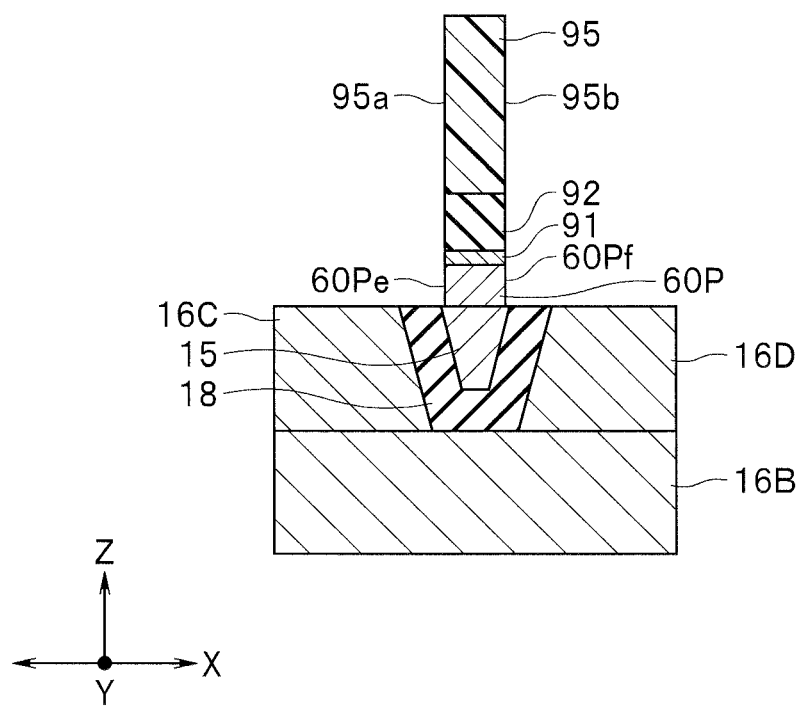
FIG. 29 is a cross-sectional view showing a step that follows the step shown in FIG. 28.

FIG. 29 shows the next step. In this step, a second etching step is performed. The second etching step in the present embodiment is a step of etching a portion of the layered film 60P using the mask 95 and the interposition layer 92 as an etching mask. The second etching step etches the layered film 60P in part so as to provide the layered film 60P with the first and second side surfaces 60e and 60f of the spin torque oscillator 60. In FIG. 29 the symbol 60Pe represents a first initial side surface of the layered film 60P including the first side surface 60e, and the symbol 60Pf represents a second initial side surface of the layered film 60P including the second side surface 60f.

The second etching step is performed by IBE, for example. When employing IBE, it is preferred that after the layered film 60P is etched with the direction of travel of the ion beams perpendicular to the top surface 1a (see FIGS. 5 and 6) of the substrate 1, a stack consisting of the layered film 60P, the interposition layer 92 and the mask 95 be etched with the direction of travel of the ion beams inclined with respect to the first and second sidewalls 95a and 95b of the mask 95. This makes it possible to eliminate a re-deposition film. Furthermore, this makes it possible to reduce the distance between the first initial side surface 60Pe and the second initial side surface 60Pf to thereby reduce the width of the layered film 60P near the position where the medium facing surface 80 is to be formed.

Figure 30:
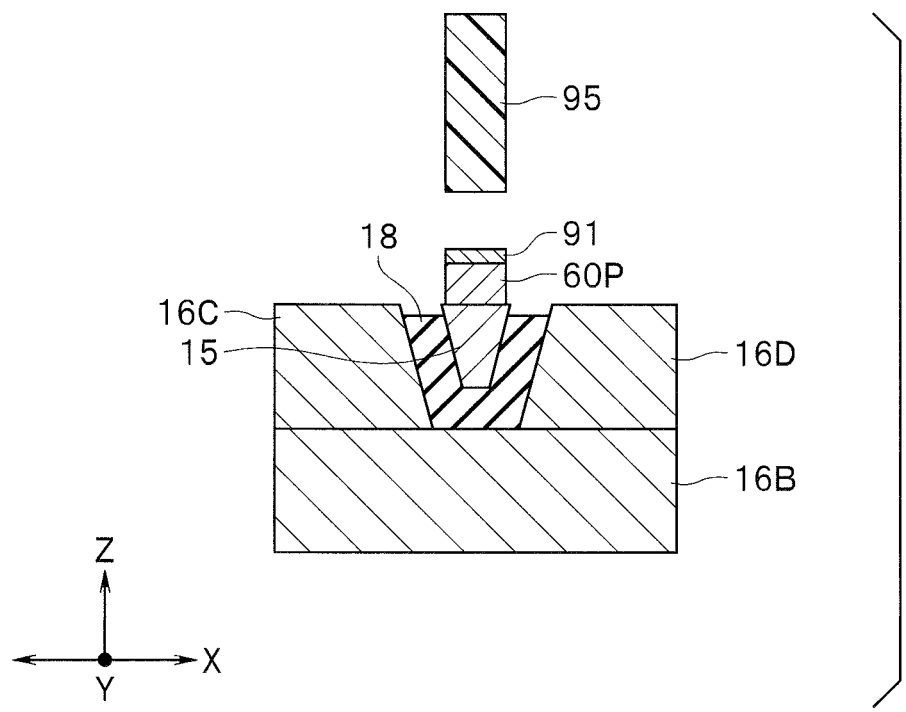
FIG. 30 is a cross-sectional view showing a step that follows the step shown in FIG. 29.

FIG. 30 shows the next step. In this step, a first removal step is performed. The first removal step in the present embodiment is a step of removing a portion of the interposition layer 92 that is covered with the mask 95. In the first removal step, a portion of the interposition layer 92 interposed between the layered film 60P and the mask 95 near the position where the medium facing surface 80 is to be formed is removed by wet etching using a developing solution of photolithography, for example. Even if the foregoing portion of the interposition layer 92 is removed, the mask 95 will not peel away since the interposition layer 92 remains between the layered film 60P and the mask 95 except in the vicinity of the position where the medium facing surface 80 is to be formed.

In the present embodiment, a positive photoresist is used to form the mask 95. Typically, positive photoresists are more difficult to pattern finely than negative photoresists. On the other hand, positive photoresists are more resistant to losing their shape during wet etching than negative photoresists. According to the present embodiment, the use of the etching mask 97 of a positive photoresist enables fine patterning of the initial mask 95P to form the mask 95. Furthermore, the use of the mask 95 of a positive photoresist prevents the mask 95 from losing its shape in the first removal step.

The other configuration, function and effects of the present embodiment are similar to those of the first embodiment.

Third Embodiment

Figure 31:
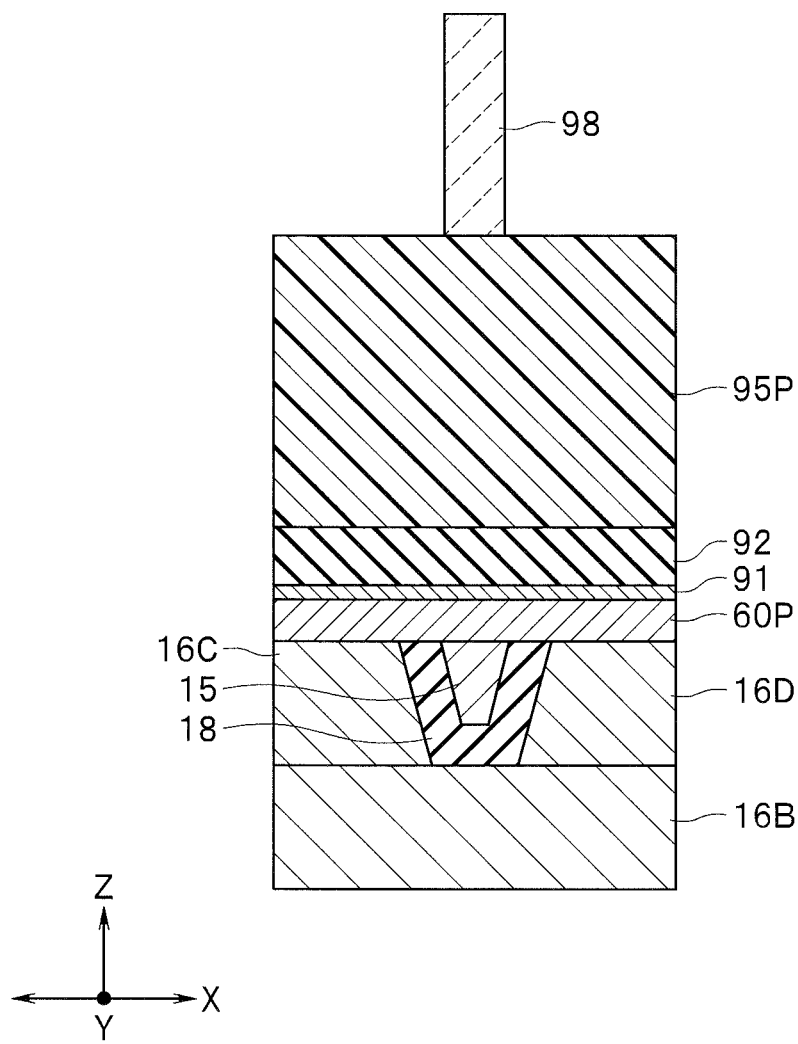
FIG. 31 is a cross-sectional view showing a step of a manufacturing method for a magnetic head according to a third embodiment of the invention.

Next, reference is made to FIG. 31 to describe a manufacturing method for a magnetic head according to a third embodiment. FIG. 31 illustrates a stack of layers formed in the process of manufacturing the magnetic head according to the present embodiment. FIG. 31 omits the illustration of portions that are closer to the substrate 1 (see FIGS. 5 and 6) relative to the leading shield 16B. FIG. 31 illustrates a cross section of the stack taken at the position where the medium facing surface 80 is to be formed.

The manufacturing method for the magnetic head according to the present embodiment is the same as the second embodiment up to the step of forming the initial mask 95P. FIG. 31 shows a step following the formation of the layered film 60P. In this step, first, an etching mask 98 of carbon is formed on the initial mask 95P. Next, the initial mask 95P is etched by, for example, RIE using the etching mask 98 so as to make the initial mask 95P into the mask 95. The etching mask 98 is then removed. The subsequent steps are the same as those in the second embodiment.

The other configuration, function and effects of the present embodiment are similar to those of the second embodiment.

[Manufacturing Method for MR Element]

A series of steps for forming the spin torque oscillator 60, which has been described in relation to the first to third embodiments, is also applicable to the MR element 5. Thus, an example in which the series of steps for forming the spin torque oscillator 60 is applied to the MR element 5 will be described below.

Figure 32:
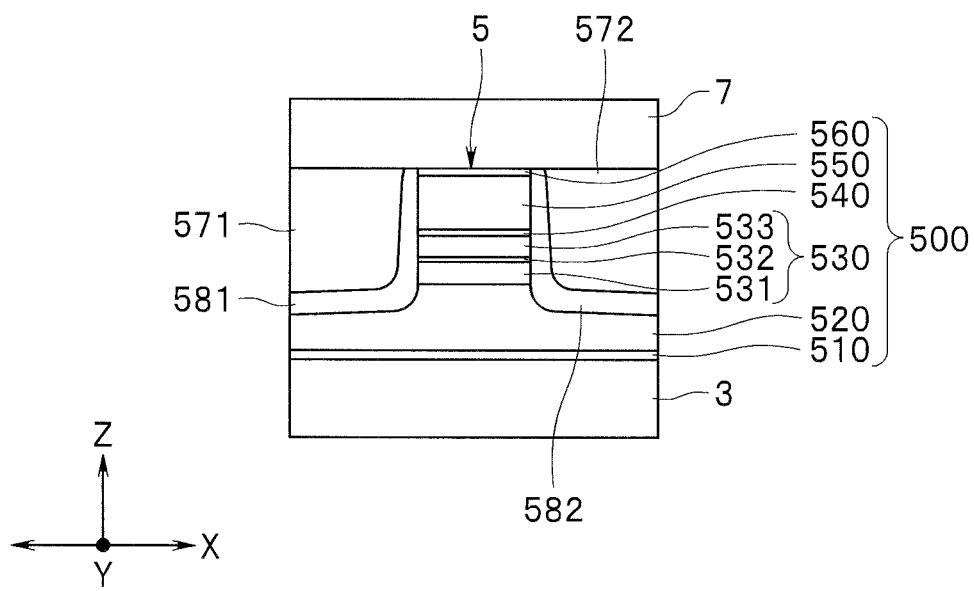
FIG. 32 is a front view showing an example of a configuration of a magnetoresistive element.

To begin with, the configuration of the MR element 5 will be described with reference to FIG. 32. FIG. 32 is a front view showing an example configuration of the MR element 5. The MR element 5 shown in FIG. 32 is a TMR element or a CPP-type GMR element.

As has been described in relation to the first embodiment, the MR element 5 is disposed between the first read shield layer 3 and the second read shield layer 7. The MR element 5 includes an MR stack 500. The MR stack 500 includes an underlayer 510, a magnetic layer 520, a pinned layer 530, a spacer layer 540, a free layer 550, and a cap layer 560 stacked in this order over the first read shield layer 3. The underlayer 510 and the cap layer 560 are each formed of a nonmagnetic conductive material such as Ru or Ta. The magnetic layer 520 is formed of a magnetic material such as NiFe.

The pinned layer 530 has a magnetization whose direction is fixed. In the example shown in FIG. 32, the pinned layer 530 includes a first magnetic layer 531, a second magnetic layer 533, and a nonmagnetic layer 532 disposed between the first magnetic layer 531 and the second magnetic layer 533, and has a so-called synthetic structure. The free layer 550 is a ferromagnetic layer whose magnetization direction varies depending on a signal magnetic field. The spacer layer 540 is a tunnel barrier layer in a TMR element, and a nonmagnetic conductive layer in a GMR element.

The MR element 5 further includes a pair of shield layers 571 and 572 disposed on opposite sides of the MR stack 500 in the track width direction (the X direction), an insulating layer 581 interposed between the MR stack 500 and each of the first read shield layer 3 and the shield layer 571, and an insulating layer 582 interposed between the MR stack 500 and each of the first read shield layer 3 and the shield layer 572. The shield layers 571 and 572 are formed of a magnetic material such as NiFe. The insulating layers 581 and 582 are formed of an insulating material such as MgO.

Next, a manufacturing method for the MR element 5 will be described with reference to FIGS. 33 to 40. FIGS. 33 to 40 each illustrate a stack of layers formed in the process of manufacturing the MR element 5. FIGS. 30 to 40 omit the illustration of portions that are closer to the substrate 1 (see FIGS. 5 and 6) relative to the first read shield layer 3. FIGS. 30 to 40 each illustrate a cross section of the stack taken at the position where the medium facing surface 80 is to be formed.

Figure 33:
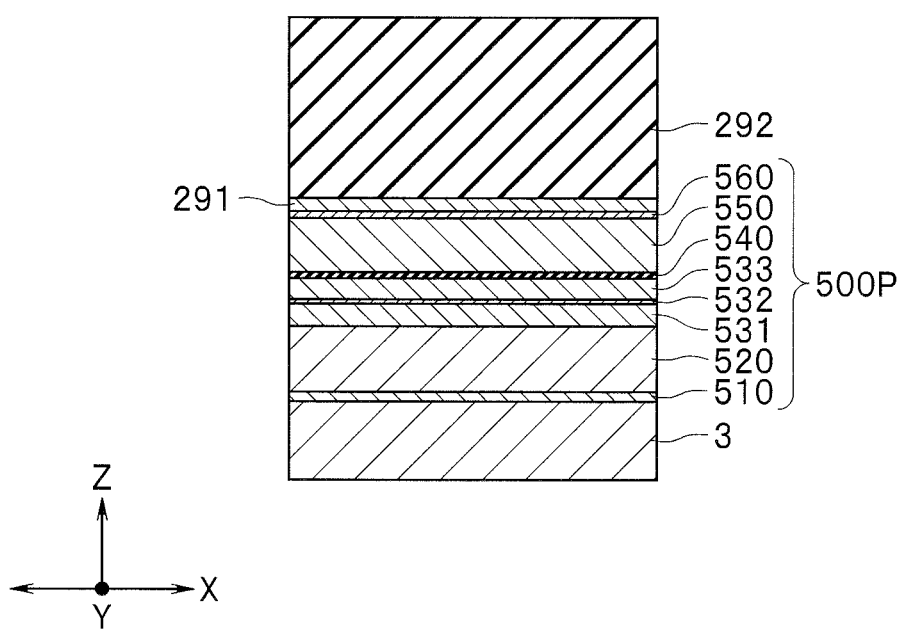
FIG. 33 is a cross-sectional view showing a step of a manufacturing method for the magnetoresistive element shown in FIG. 32.

As shown in FIG. 33, the manufacturing method for the MR element 5 starts with forming a layered film 500P, which is to become the MR stack 500 later, on the first read shield layer 3. The layered film 500P includes the underlayer 510, the magnetic layer 520, the first magnetic layer 531, the nonmagnetic layer 532, the second magnetic layer 533, the spacer layer 540, the free layer 550, and the cap layer 560 stacked in this order over the first read shield layer 3. Next, a nonmagnetic metal layer 291 of Ru is formed on the layered film 500P. Next, an interposition layer 292 of alumina is formed on the nonmagnetic metal layer 291.

Figure 34:
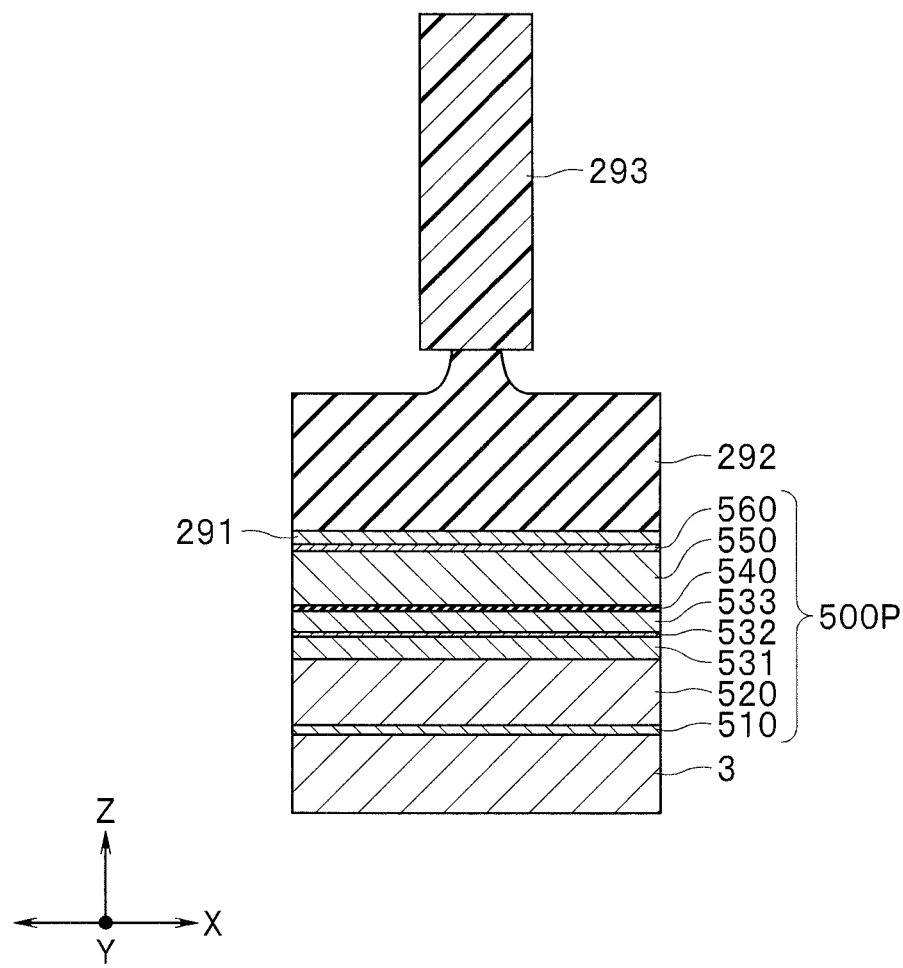
FIG. 34 is a cross-sectional view showing a step that follows the step shown in FIG. 33.

FIG. 34 shows the next step. In this step, first, a photoresist layer of a positive photoresist is formed over the entire top surface of the stack. The photoresist layer is then selectively exposed to light using a photomask. The exposed photoresist layer is then developed. As a result of the exposure, a portion of the photoresist layer that has been irradiated with the light through the light-transmitting portion of the photomask becomes soluble in a developing solution, while the other portion remains insoluble in the developing solution. The photoresist layer remaining after the development makes a mask 293. As shown in FIG. 34, the development of the photoresist layer causes part of the interposition layer 292 to be etched away by the developing solution.

Figure 35:
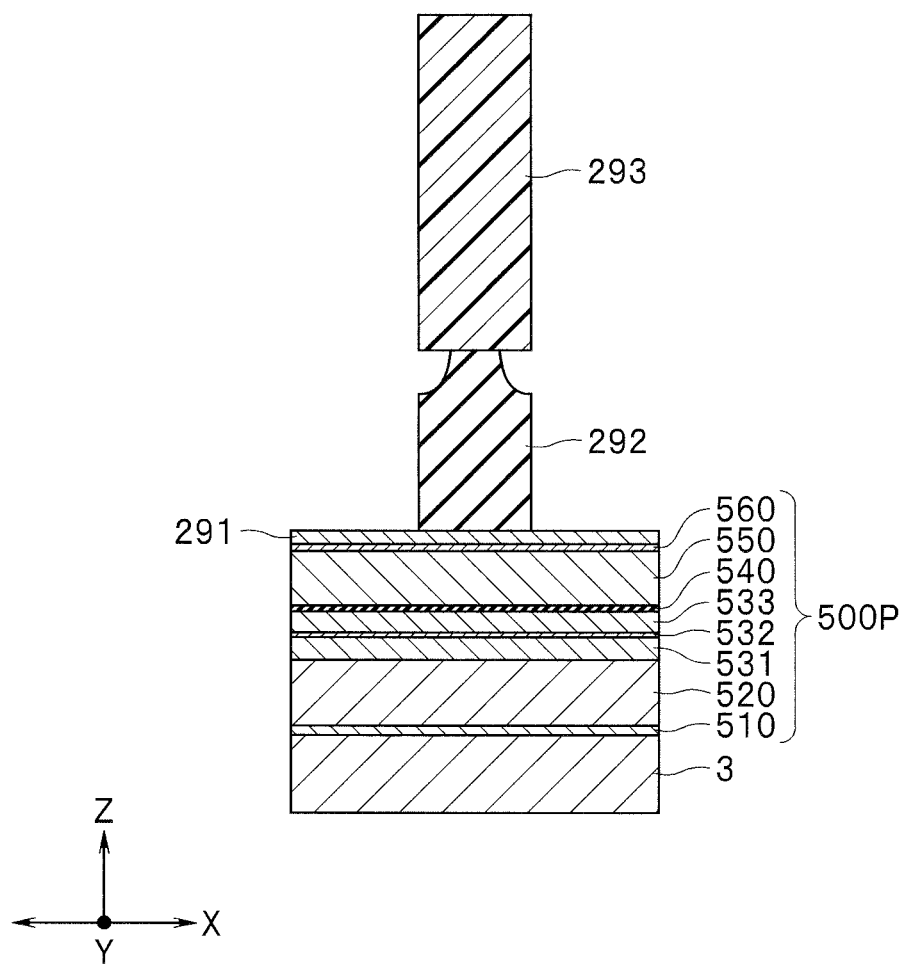
FIG. 35 is a cross-sectional view showing a step that follows the step shown in FIG. 34.

FIG. 35 shows the next step. In this step, a portion of the interposition layer 292 is etched by, for example, RIE using the mask 293. The nonmagnetic metal layer 291 functions as an etching stopper to stop etching when the interposition layer 292 is etched by RIE.

Figure 36:
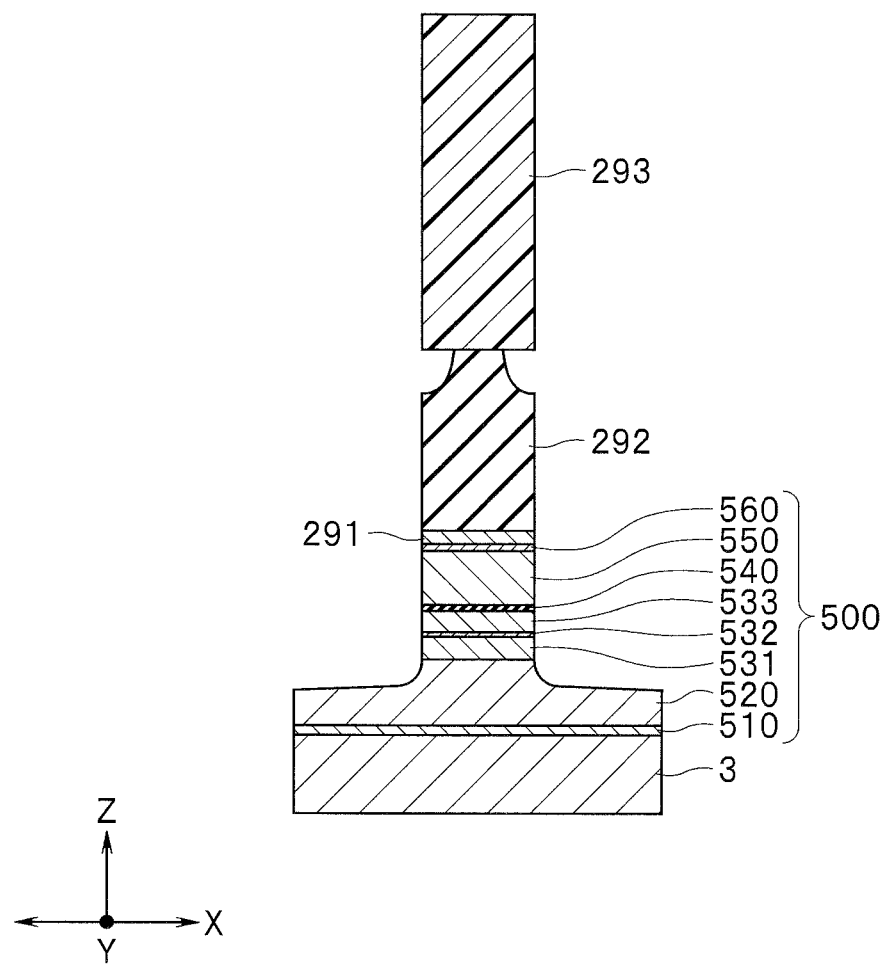
FIG. 36 is a cross-sectional view showing a step that follows the step shown in FIG. 35.

FIG. 36 shows the next step. In this step, a portion of the layered film 500P is etched by, for example, IBE using the mask 293 and the interposition layer 292 as an etching mask. This etching etches all the layers constituting the layered film 500P except the underlayer 510.

Figure 37:
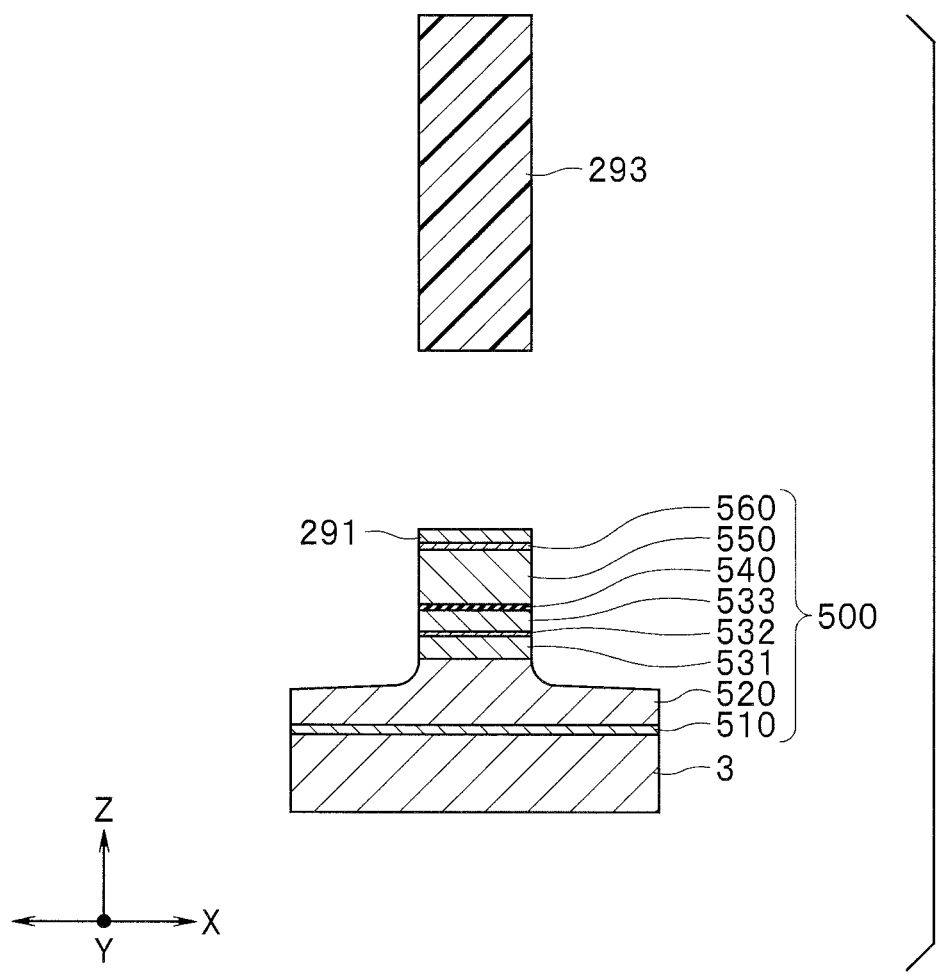
FIG. 37 is a cross-sectional view showing a step that follows the step shown in FIG. 36.

FIG. 37 shows the next step. In this step, a portion of the interposition layer 292 interposed between the layered film 500P and the mask 293 near the position where the medium facing surface 80 is to be formed is removed by wet etching using a developing solution of photolithography, for example.

Figure 38:
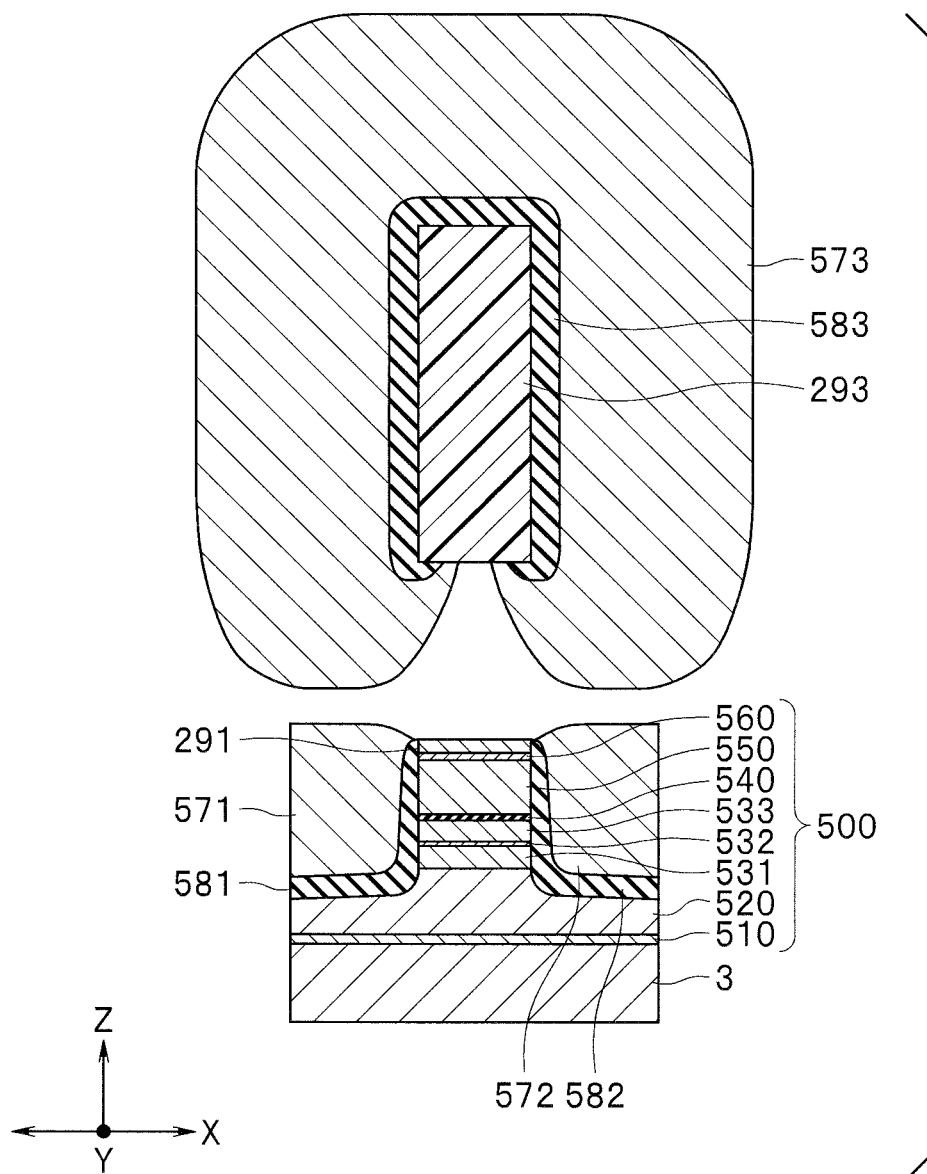
FIG. 38 is a cross-sectional view showing a step that follows the step shown in FIG. 37.
Figure 39:
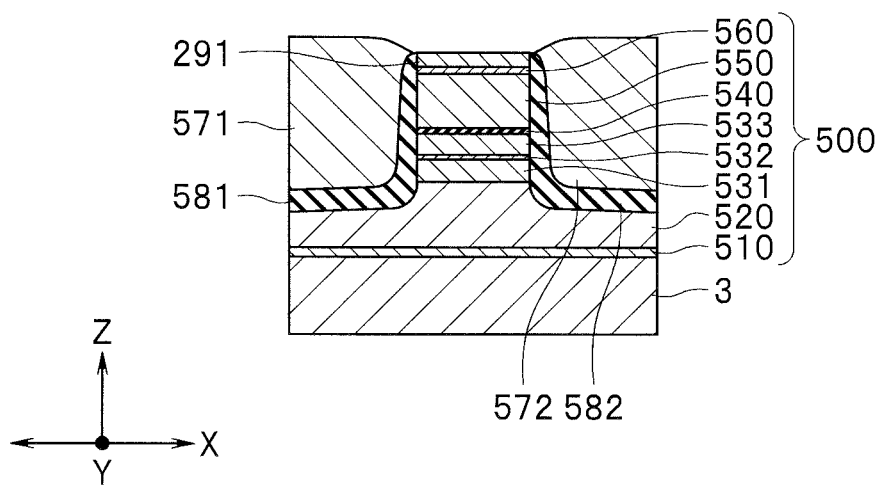
FIG. 39 is a cross-sectional view showing a step that follows the step shown in FIG. 38.

FIG. 38 shows the next step. In this step, first, the insulating layers 581 and 582 are formed with the mask 293 left intact. Note that the material for forming the insulating layers 581 and 582 deposit also on the surfaces of the mask 293. In FIG. 38, the symbol 583 represents a portion of the material for forming the insulating layers 581 and 582 that has deposited on the surfaces of the mask 293. Next, the shield layers 571 and 572 are formed with the mask 293 left intact. Note that the material for forming the shield layers 571 and 572 deposit also on the surfaces of the portion 583. In FIG. 38, the symbol 573 represents a portion of the material for forming the shield layers 571 and 572 that has deposited on the surfaces of the portion 583. Next, the mask 293 is lifted off as shown in FIG. 39.

Figure 40:
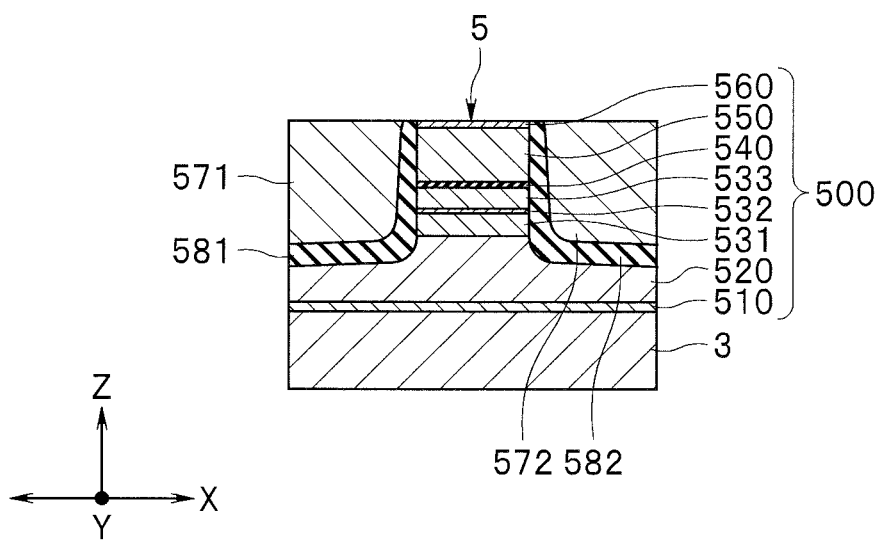
FIG. 40 is a cross-sectional view showing a step that follows the step shown in FIG. 39.

FIG. 40 shows the next step. In this step, first, the nonmagnetic metal layer 291 is removed and the top surfaces of the shield layers 571 and 572 are etched by, for example, IBE. Next, a portion of the layered film 500P away from the position where the medium facing surface 80 is to be formed is etched to as to make the layered film 500P into the MR stack 500. The layered film 500P thus becomes the MR stack 500. The insulating layer 6 (see FIG. 5) is formed over the entire top surface of the stack. The insulating layer 6 is then polished by, for example, CMP, until the MR stack 500 is exposed. The MR element 5 is thereby completed.

As has been described, if the series of steps for forming the spin torque oscillator 60 is applied to the MR element 5, it is possible to prevent the MR stack 500 from being taper-etched as is the case with the spin torque oscillator 60, and as a result, it is possible to prevent the side surfaces of the MR stack 500 formed by etching from becoming inclined in part.

The present invention is not limited to the foregoing embodiments, and various modifications may be made thereto. As long as the requirements of the appended claims are met, the shape and location of the spin torque oscillator 60 are not limited to the examples illustrated in the foregoing embodiments but can be freely chosen. For example, the front end face 60a of the spin torque oscillator 60 may be located away from the medium facing surface 80.

The step shown in FIG. 14 in the present embodiment is not an essential step of the manufacturing method for the magnetic head of the present invention, and can be omitted. In such a case, the top edge Em1 of the end face 15a of the main pole 15 has a width different from the width of the bottom edge Es of the front end face 60a of the spin torque oscillator 60. Further, in such a case, the width of the end face 15a of the main pole 15 decreases with increasing distance from the top edge Em1, that is, with increasing proximity to the top surface 1a of the substrate 1.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A manufacturing method for a magnetic head, the magnetic head including:
    a medium facing surface configured to face a recording medium;
    a main pole configured to generate a write magnetic field for writing data on the recording medium;
    a trailing shield formed of a magnetic material and located forward relative to the main pole in a direction of travel of the recording medium;
    a spin torque oscillator disposed between the main pole and the trailing shield and electrically connected to the main pole and the trailing shield; and
    a substrate having a top surface,
    wherein the main pole, the trailing shield and the spin torque oscillator are disposed over the top surface of the substrate,
    the manufacturing method comprising the steps of:
    forming the main pole;
    forming the spin torque oscillator after the main pole is formed; and
    forming the trailing shield after the spin torque oscillator is formed, wherein the step of forming the spin torque oscillator includes:
    a step of forming a layered film on the main pole, the layered film becoming the spin torque oscillator later;
    a step of forming an interposition layer on the layered film;
    a step of forming a mask on the interposition layer;
    a first etching step of etching a portion of the interposition layer using the mask;
    a second etching step of etching a portion of the layered film using the mask and the interposition layer as an etching mask after the first etching step;
    a step of removing the interposition layer and the mask after the second etching step; and
    a patterning step of patterning the layered film into the spin torque oscillator after the interposition layer and the mask are removed.

2. The manufacturing method for the magnetic head according to claim 1, wherein
    the spin torque oscillator has a rear end face located farthest from the medium facing surface, and a first side surface and a second side surface opposite to each other in a track width direction,
    the mask has a first sidewall for defining a shape and a position of the first side surface, and a second sidewall for defining a shape and a position of the second side surface,
    the second etching step is a step of etching the layered film so as to provide the layered film with the first side surface and the second side surface, and
    the patterning step is a step of etching the layered film so as to provide the layered film with the rear end face.

3. The manufacturing method for the magnetic head according to claim 1, wherein the interposition layer is formed of an inorganic insulating material.

4. The manufacturing method for the magnetic head according to claim 1, wherein the mask is formed of a positive photoresist.

5. The manufacturing method for the magnetic head according to claim 1, wherein the mask is formed of a negative photoresist.

6. The manufacturing method for the magnetic head according to claim 5, wherein the step of forming the mask includes the steps of:
    forming an initial mask which is to become the mask later;
    forming a separating film on the initial mask;
    forming an etching mask of a positive photoresist on the separating film;
    etching the initial mask and the separating film using the etching mask so as to make the initial mask into the mask; and
    removing the etching mask.

7. The manufacturing method for the magnetic head according to claim 5, wherein the step of forming of the mask includes the steps of:
    forming an initial mask which is to become the mask later;
    forming an etching mask of carbon on the initial mask; and
    etching the initial mask using the etching mask so as to make the initial mask into the mask.

8. The manufacturing method for the magnetic head according to claim 1, wherein
    the magnetic head further includes nonmagnetic layers located on opposite sides of the spin torque oscillator in a track width direction, and
    the step of removing the interposition layer and the mask includes a first removal step of removing a portion of the interposition layer that is covered with the mask, and a second removal step of removing a remainder of the interposition layer and the mask,
    the manufacturing method further comprising the step of forming the nonmagnetic layers with the mask left intact after the first removal step and before the second removal step.

9. The manufacturing method for the magnetic head according to claim 1, wherein
    the spin torque oscillator has a first side surface and a second side surface opposite to each other in a track width direction, and
    each of the first side surface and the second side surface forms an angle in a range of 0° to 7° with respect to a direction perpendicular to the top surface of the substrate.

10. The manufacturing method for the magnetic head according to claim 1, wherein
    the main pole has an end face located in the medium facing surface,
    the end face of the main pole has a top edge farthest from the top surface of the substrate,
    the spin torque oscillator has a front end face located in the medium facing surface,
    the front end face of the spin torque oscillator has a bottom edge closest to the top surface of the substrate,
    a width of the top edge in a track width direction is equal to a width of the bottom edge in the track width direction, and
    a position of the top edge in the track width direction is same as a position of the bottom edge in the track width direction.

* * * * *